United States Patent [19]
Blanc et al.

[11] Patent Number: 6,055,235
[45] Date of Patent: Apr. 25, 2000

[54] SWITCHING SYSTEM

[75] Inventors: Alain Blanc, Tourrettes s/Loup; Christian Landry, Carros; Michel Poret, Gattieres; Jean-Claude Robbe, Cagnes s/Mer, all of France

[73] Assignee: International Business Machines Corporation, Armonk, N.Y.

[21] Appl. No.: 08/992,232

[22] Filed: Dec. 17, 1997

[30]   Foreign Application Priority Data

Dec. 20, 1996 [EP] European Pat. Off. .............. 96480117

[51] Int. Cl.[7] ................................................. H04L 12/56
[52] U.S. Cl. ............................................ 370/389; 370/429
[58] Field of Search .................................... 370/390, 398,
370/396, 397, 399, 413, 389, 366, 465,
466, 469, 386, 391, 419, 421, 422, 428,
429, 395

[56]   References Cited

U.S. PATENT DOCUMENTS

| | | | |
|---|---|---|---|
| 5,394,397 | 2/1995 | Yagani et al. ............................ | 370/368 |
| 5,475,679 | 12/1995 | Manter ...................................... | 370/395 |
| 5,500,851 | 3/1996 | Kozaki et al. ........................... | 370/368 |
| 5,583,858 | 12/1996 | Hanaoka .................................. | 370/392 |
| 5,612,952 | 3/1997 | Motoyama ............................... | 370/412 |
| 5,710,770 | 1/1998 | Kozaki et al. ........................... | 370/368 |
| 5,898,687 | 4/1999 | Harriman et al. ....................... | 370/390 |

FOREIGN PATENT DOCUMENTS 0 607 673 A2  1/1993  European Pat. Off. .

OTHER PUBLICATIONS

"Multicast/Broadcast Mechanism for a Shared Buffer Packet Switch", IBM TDB, vol. 34/No. 10A, Mar. 1992, pp464–465.

"622 Mb/s 8×8 Shared Multibuffer ATM Switch with Hierarchical Queueing and Multicast Functions" Yamanaka, et al, IEEE, Nov. 29, 1993, pp. 1488–1495.

*Primary Examiner*—Douglas W. Olms
*Assistant Examiner*—Kenneth Vanderpuye
*Attorney, Agent, or Firm*—Douglas W. Cameron; Anne Vachon Dougherty

[57]   ABSTRACT

A cell switching module and switching system for routing cells each having a cell header comprising a plurality of input and output ports; at least one common cell storage connected between the input and output ports and comprising a plurality of storage locations having addresses; a storage section for performing storage of cells coming through any one of the input ports into the common cell storage and comprising a plurality of receiver means for performing the physical interface for the plurality of input ports, a plurality of input routers for connection the input ports to the cell storage, a plurality of ASA registers for providing the input routers with addresses to be used for storing the cells into the cell storage; and a retrieve section for retrieving cells from storage and for transporting them to one of the output ports, where the retrieve section comprises a plurality of output routers for retrieving the data stored in any locations of the cell storage, a plurality of drivers for connecting to the output ports, and a plurality of ARA registers for providing addresses of the cells which are to be outputted from the cell storage to the output routers.

20 Claims, 17 Drawing Sheets

SWITCHING SYSTEM

CROSS-REFERENCE TO RELATED APPLICATIONS

This application relates to co-pending patent applications Ser. Nos. 08/992,015 and 08/992,871 respectively entitled "Switching System Comprising Distributed Elements Allowing Attachment To Line Adapters And Having Multicasting Capabilities" and "Switching System Comprising Distributed Elements Allowing Attachment to Line Adapters", having the same priority date as the present application, assigned to the same assignee and herein incorporated by simple reference.

TECHNICAL FIELD OF THE INVENTION

The invention relates to telecommunications and more particularly to a switching system for achieving the routing of cells from one of a set of M input ports to any one of a set of M output ports.

BACKGROUND OF THE INVENTION

The need for higher speeding system is increasing particularly with the development of more sophisticated networks, multimedia applications and high speed communications. The requirements are such that today 100 Gigabit/s switches will be more and more needed. However, a first problem comes from the fact that the speed of the switch is strongly dependent on the actual technology that is used. Therefore, for a defined state of the technology it seems difficult to achieve the possibility of enhancing the switches that are known. There is therefore a need for aggregating elementary switching module in such a way that still preserves the internal capabilities and efficiency of the module. Particularly, it is essential that the combination of the switching structure does not require input or output ports for performing the arrangement, thus decreasing the number of ports that remains for the customer. Additionally, it is necessary that the aggregate switching system remain in single stage.

A second problem arises from the fact that the customers' premises are equipped with line attachments that are fixed and determined for a relatively long period of time, at least since the investments being performed for the telecommunications equipments can not be drastically lost. Therefore, although there is a strong need for higher speed switching systems, there is a desire for preserving the investments that were already made and thus for permitting a wide range of attachments.

Additionally, the switching system should be adapted to ATM telecommunication links and provide wide multicasting capabilities (that is to say the possibility of duplicating the cell being entered into the switch so that the latter can be duplicated at different output ports), and should permit the different line attachments to be achieved in different physical areas.

SUMMARY OF THE INVENTION

The problem to be solved by the present invention is to provide a switching system, based on a switching module that permits higher speed with a given technology. Additionally, the switching system has to permit a wide range of existing attachments, including ATM lines, and permit wide multicasting capabilities and easy physical connections.

A new arrangement of switching module has been designed, as defined in claim 1, which permits easy combination in order to provide higher speed even with a limited technology. Basically, the switching module includes a storage section that comprises a set of M receivers, a set of M input routers for realizing the connection of the M input ports to any one of the different locations of a cell storage. The storage section further includes a set of M ASA registers for providing the input routers with the addresses to be used for storing the cells into the cell storage. Additionally, the switching module includes a retrieve section that comprises a set of M output routers for retrieving the data located in any locations of said cell storage, a set of M ARA registers for providing the output routers with the addresses of the cells which are to be outputted from said cell storage.

A specific control section provides the input process and the output process of the cells that are entered into the switch. The input control section comprises an FAQ address generating means for providing the addresses of the empty locations into cell storage, and first multiplexing means for providing either the addresses generated by the FAQ circuit or addresses provided by a first external bus to said M ASA registers. A set of holding registers is used for retaining the module routing header as long as the cells are being inputted in the cell storage.

The output control section comprises a set of M OAQ queueing means for queueing the addresses of the locations within said cell storage that contain cells that are to be transmitted to output ports. Each queuing means has an input for receiving the contents of the ASA registers and is connected to a corresponding one of said M output ports. Additionally, control means receive the module routing header retained by the holding registers and generate WE control signals for all the queuing means so as to load, into each queue associated to an output port where the cell should be duplicated, the contents of the ASA registers. Second multiplexing means are provided so as to provide to the M ARA registers either the addresses provided by the queuing means or the addresses provided by a second external bus.

A specific Book_Keep_Memory registration circuit (7) is used for preventing an address in cell storage from being made available as long as the last occurrence of the considered address disappears from the contents of the queuing means. By means of the first and second multiplexor, it becomes possible to realize the routing process internally or externally. Indeed, the addresses that are used for performing both the input and output process may either be generated by means of the internally located circuits, including the addresses generating means and control circuit, or may be achieved by means of an external circuitry (with respect to the module being considered).

In this way, it becomes quite easy to aggregate different switching modules and to make them operate in speed expansion mode under control of a master module that provides the addresses needed for both the ASA and ARA registers by means of the first and second buses. This entails the substantial advantage of increasing the overall speed of the switching apparatus that comprise numerous switching modules, even with a determined state of technology.

In a particular embodiment of the invention, the switching structure is advantageously combined with a set of distributed, elementary Switch Core Access Layer (S.C.A.L.) elements that are communicating with input and output ports via serial communication links. Each SCAL element comprises a PINT circuit which allows attachment to a particular Protocol Adapter, or Protocol Engine, and which comprises a set of FIFOs for the receive and transmit parts that correspond to each individual module being aggregated. Each FIFO of the receive part receives a portion of the cell being sliced so that the corresponding part may be processed by the corresponding switching module of the switching structure operating in speed expansion mode. Additionally, each SCAL element comprises control means for performing Time Division Multiplex (TDM) of the communication link with the switching structure so that each PINT circuit can get access to four times the bandwidth with one port. This eventually provides an overall switching architecture that permits a wide variety of attachments with the different existing line adapters. The SCAL elements communicate with the switch core by means of serialized cables, thus allowing the SCAL elements to be located at a great distance from the centralized switch core system.

Preferably, the receive part of each PINT circuit includes means for introducing at least one extra byte to every cell that will be reserved for carrying the routing header that will be used for controlling the switching structure in a first step, then the PINT transmit circuit in a second step. Indeed, the transmit part of every PINT circuit comprises, in addition to at least one second FIFO storage for storing the data cells, a control module for receiving all the cells being generated at the output port of the switching structure to which is attached the SCAL element being considered. In accordance with the value carried by the at least one extra byte, the control means decides whether to discard the cell or not. While the receive part of the PINT circuit performs the introduction of the extra byte(s) needed for controlling the routing and multicasting operations, the accurate values that are needed for doing this are generated into the switching system by means of two successive read operations of routing tables, a first operation performed prior to the routing of the cell within the switching system, a second operation performed after the routing the cell at the level of each output port. These two successive read operations achieve a two-level multicast feature that provides wide multicasting capabilities, even when the SCAL elements are distributed at different physical areas of the switching system.

In a preferred embodiment of the invention, the tables that are used for providing the values needed for the switching structure or the PINT transmit circuits are loaded into a same storage module that is located in the centralized switch core. This greatly facilitates the update control mechanism of the routing.

DETAILED DESCRIPTION OF THE PREFERRED EMBODIMENT

Figure 1:
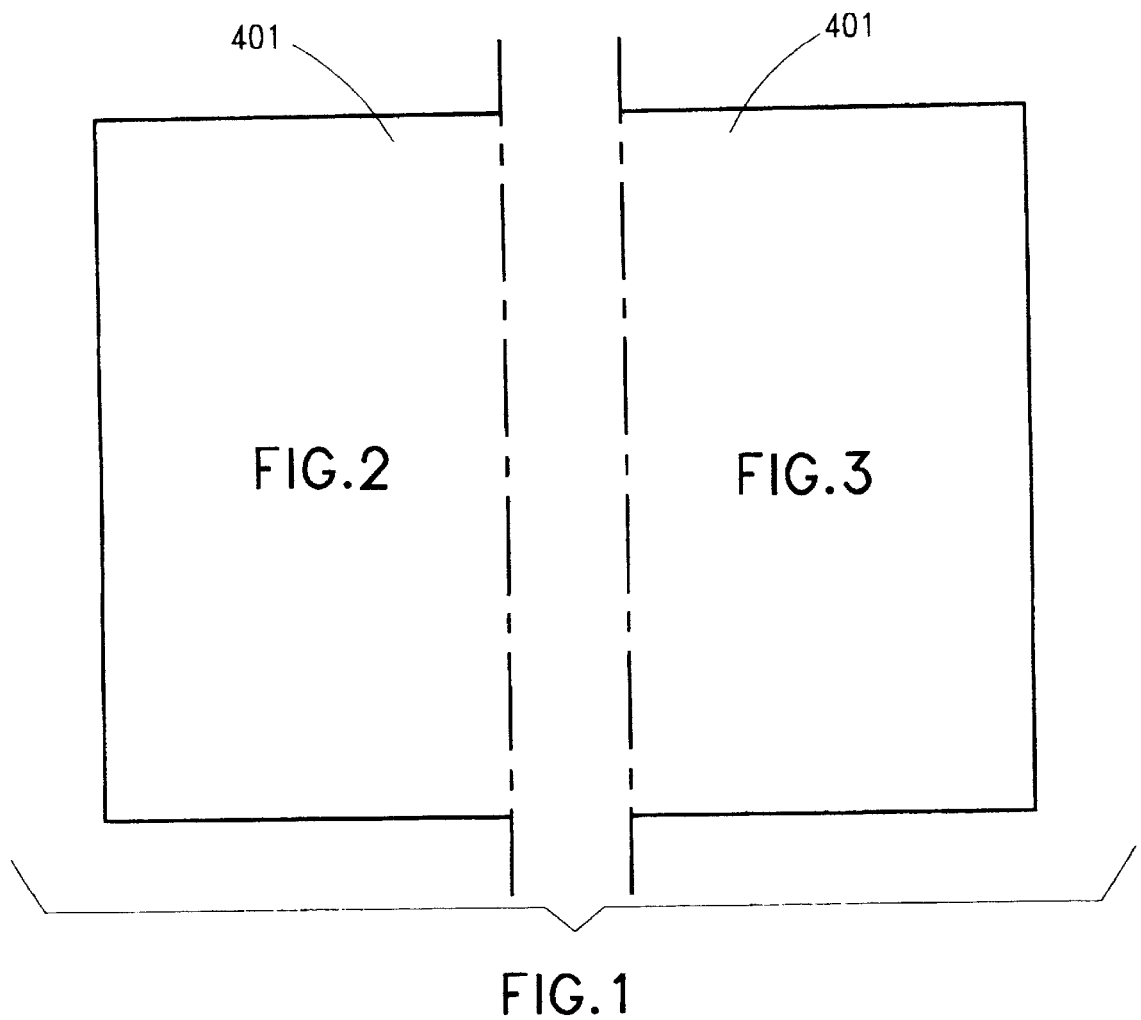
FIG. 1 shows the arrangement of the components of the switching module of FIGS. 2 and 3 in order to provide a full and comprehensive illustration of the switching module used for embodying the present invention.
Figure 2:
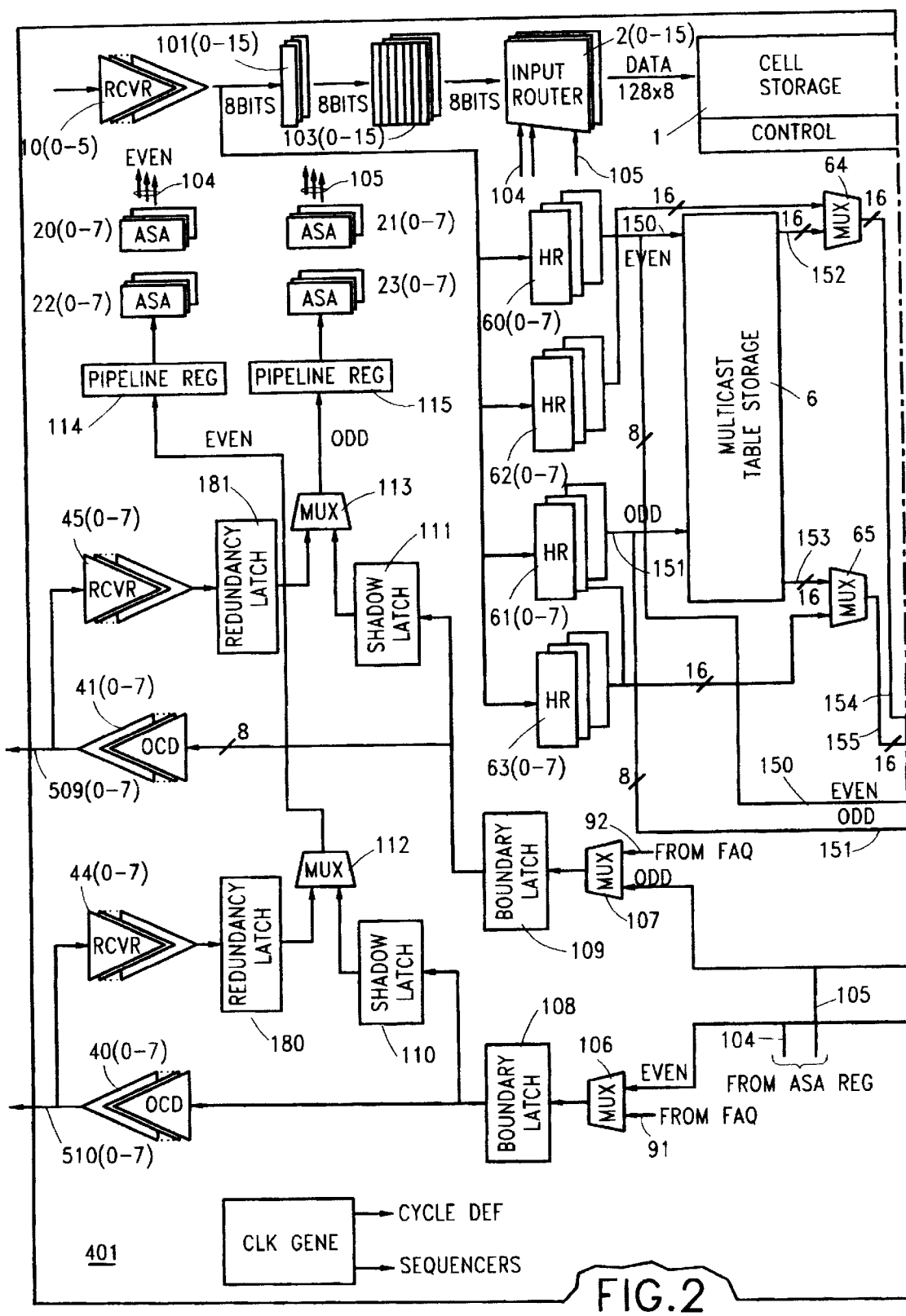
FIGS. 2 and 3 illustrate the structure of the switching module that is used in the preferred embodiment of the present invention.
Figure 3:
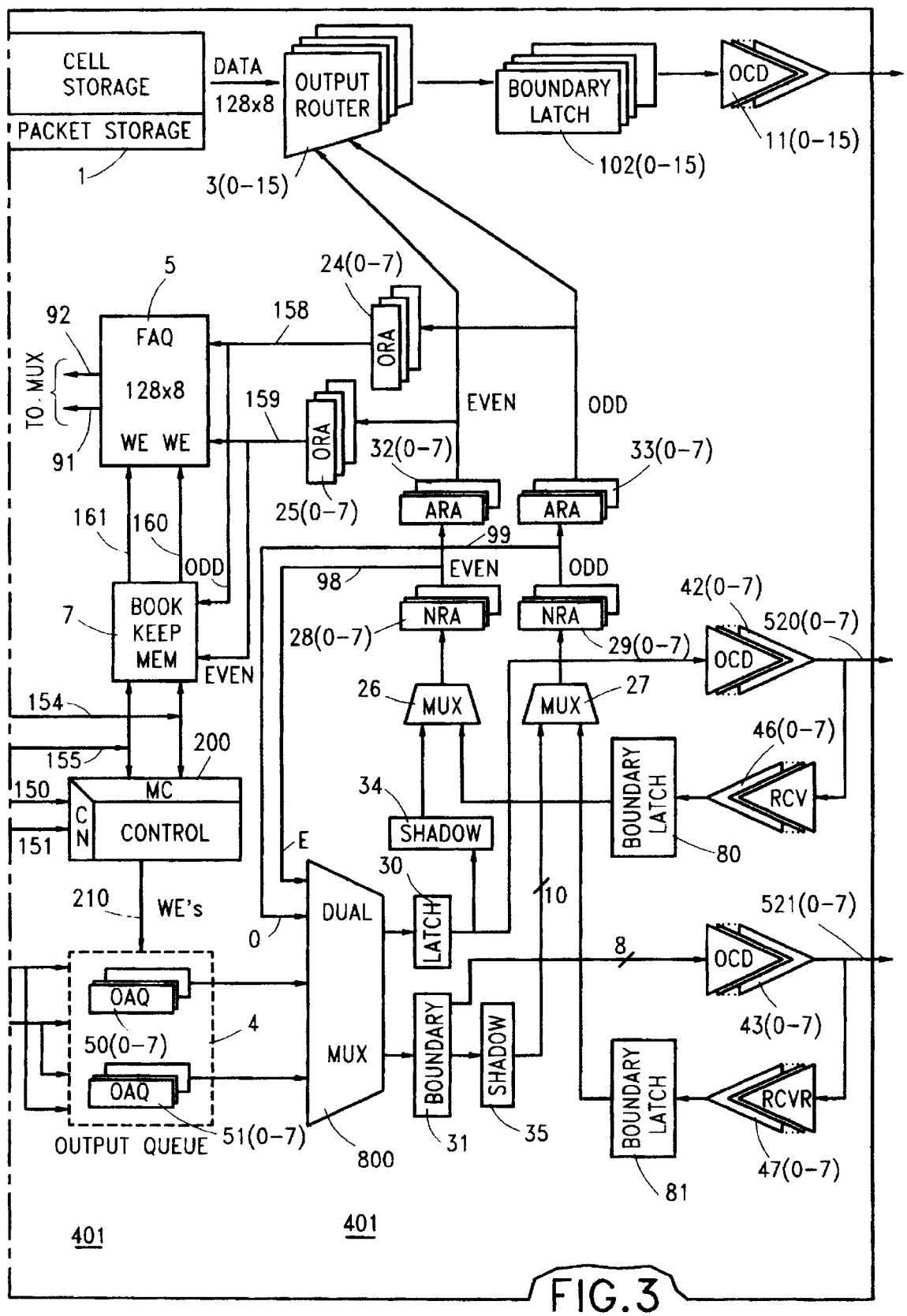

With respect to FIGS. 2 and 3, there is illustrated the switching module that is used for embodying the switching apparatus in accordance with the present invention. This module, represented in block 401, includes a data side comprising a storage section for performing the storage process of the cells coming through any one of the sixteen input ports into a common Cell Storage 1, in addition to a retrieve side for outputting the cells loaded in the Cell Storage and for transporting them to any output port of the switching module.

The storage section uses a set of sixteen RCVR receivers 10-0 to 10-15 (receiver 10-15 being representing in dark in the figure) which represent the physical interface for the sixteen different input ports. A set of sixteen corresponding routers 2-0 to 2-15 (router 2-15 being similarly represented in dark in FIG. 2) achieves the connection of the input ports to any one of the 128 positions of Cell Storage 1. For timing considerations, the storage section further comprises a set of sixteen boundary latches 101-0 to 101-15 (latch 101-15 being represented in dark in the figure) and a set of pipeline circuits 103-0 to 103-15, so that the data that is transmitted by every receiver 10-i is conveyed to router 2-i via its corresponding boundary latch 101-i and pipeline 103-i.

On the other side, the retrieve section of switching module 401 comprises a set of sixteen Off Chip Drivers (OCD) drivers 11-0 to 11-15 which are used for interfacing the sixteen output ports of the switching module. The OCD drivers receive the data from sixteen routers 3-0 to 3-15 via an associated set of sixteen boundary latches 102-0 to 102-15 (used for timing considerations), so that each router 3-i can retrieve any data located within the 128 locations that are available in Cell Storage 1, and can transport them via a corresponding OCD driver 11-i towards the appropriate destination output port.

In addition to the data section, the switching module further comprises a control section that is based on a Free Access Queue (FAQ) circuit 5 (represented in FIG. 3) which is used for storing the addresses of the empty locations in Cell Storage 1. An Output Queue Memory 4 is constituted by two distinctive set of eight Output Address Queues (OAQ) 50-0 to 50-7 (queue 50-7 being represented in dark in the figure) and 51-0 to 51-7 (the latter being illustrated in dark). As it will be explained hereinafter with greater details, these two sets of queues are used for storing the address of the location within Cell Storage 1 that contains the data cells that are to be transmitted to the output ports. Two sets of eight registers, namely ASA Registers 20-0 to 20-7 (in FIG. 2 with register 20-7 being in dark) and ASA Registers 21-0 to 21-7 (in FIG. 2 with the latter being in dark), are respectively used for generating addresses on a set of two buses, ODD bus 104 and EVEN bus 105. The two buses are connected to the sixteen Routers 2-0 to 2-15, and to OAQ queue 4. Bus 104 is formed by the association of the eight output buses of ASA registers 20-0 to 20-7 (composed of 64 bytes), while bus 105 is a 64 byte bus that is constituted from the combination of the output buses of the eight ASA registers 21-0 to 21-7.

Additionally, EVEN bus 104 is connected to a first input bus of a MUX multiplexor 106 which is also connected at a second input to receive the free addresses from F'AQ 5 via bus 91. The output of MUX 106 is connected to a boundary latch 108, the output of which is connected to the inputs of a set of eight Of f Chip Drivers (OCD) 40-0 to 40-7 and to a shadow latch 110. OCD drivers 40-0 to 40-7 have outputs which are respectively connected to form an 8-bit bus 510 (formed of eight outputs 510-0 to 510-7), also connected to the input of corresponding RCVR receivers 44-0 to 44-7. The outputs of RCVR receivers 44-0 to 44-7 are connected to a redundancy latch 180, which output is connected to one input bus of a MUX multiplexor 112, the second input of which receives the contents of shadow latch 110. MUX multiplexor 112 has an output that is connected to a pipeline Register 114 in order to load the data therethrough conveyed into the appropriate NSA registers 22-0 to 22-7 as will be described hereinafter.

Similarly, ODD bus 105 is connected to a first input bus of a MUX multiplexor 107 receiving at a second input the free addresses from FAQ 5 via bus 92. The output of MUX 106 is connected to a boundary latch 109, the output of which is connected to the inputs of a set of eight Off Chip Drivers (OCD) 41-0 to 41-7 and to a shadow latch 111. OCD drivers 41-0 to 41-7 have their outputs 509-0 to 509-7, which are respectively assembled in order to form an 8-bit bus 509, also connected to the inputs of eight RCVR receivers 45-0 to 45-7. The outputs of RCVR receivers 45-0 to 45-7 are connected to a redundancy latch 181, which output is connected to one input bus of a MUX multiplexor 113, the second input of which receives the contents of shadow latch 111. MUX multiplexor 113 has an output that is connected to a pipeline Register 115 so that the addresses can be made available to the appropriate NSA registers 23-0 to 23-7 as will be described hereinafter.

The control section further comprises four sets of Holding Registers 60-0 to 60-7, 61-0 to 61-7, 62-0 to 62-7, and 63-0 to 63-7 (in FIG. 2 with Registers 60-7, 61-7, 62-7 and 63-7 being represented in dark), that will be used for performing the switching process as will be described with greater details.

Coming back to the data section, it should be noticed that the sixteen input ports can simultaneously load sixteen cells into Cell Storage 1 at the addresses that are defined by the contents of a two sets of eight ASA 20-0 to 20-7 registers and ASA 21-0 to 21-7. During the same time, sixteen cells can be extracted from Cell Storage 1 at the addresses that are defined by the contents of sixteen ARA registers, arranged in two sets of eight registers each: ARA registers 32-0 to 32-7 (Register 32-7 being in dark in FIG. 3) and ARA registers 33-0 to 33-7 (33-7 also in dark in FIG. 3). ARA registers 32-0 to 32-7 receive the contents of corresponding NRA registers 28-0 to 28-7 through an EVEN bus 98 which is also connected to a first input of a dual-multiplexor circuit 800. Similarly, ARA registers 33-0 to 33-7 receive the contents of corresponding NRA registers 29-0 to 29-7 through an ODD bus 99 which is connected to a second input of dual-multiplexor circuit 800. Dual-multiplexor 800 respectively receives the output of the first and second set of OAQ queues 50-0 to 50-7 and 51-0 to 51-7 at third and fourth inputs. Dual-Multiplexor 800 has two output bus which are respectively connected to a boundary latch 30 and to a boundary latch 31.

NRA registers 28-0 to 28-7 are connected to receive the output of a MUX multiplexor circuit 26 which has a first and a second input that respectively receive the contents of a shadow latch 34 and a boundary latch 80. Similarly, NRA registers 29-0 to 29-7 are connected to receive the output of a MUX multiplexor circuit 27 which has a first and a second input that respectively receive the contents of a shadow latch 35 and a boundary latch 81. The output of latch 30 is connected to the input bus of shadow latch 34 and also to the inputs of a set of eight Off Chip Drivers (OCD) 42-0 to 42-7, which outputs 520-0 to 520-7 are assembled in order to form a bus 520 connected to the inputs of eight RCV Receivers 46-0 to 46-7. Similarly, the output of latch 31 is connected to the input bus of shadow latch 35 and also to the inputs of a set of eight Off Chip Drivers (OCD) 43-0 to 43-7, which outputs 521-0 to 521-7, form a bus 521 connected to corresponding inputs of a set of eight RCVR Receivers 47-0 to 47-7. The outputs of RCVR receivers 46-0 to 46-7 are connected to the input bus of latch 80, and the outputs of RCVR receivers 47-0 to 47-7 are connected to the input bus of latch 81.

As will be described below, it will appear that the structure of the present invention permits a set of sixteen cells to be simultaneously extracted from Cell Storage 1, and routed to the appropriate output port. Should one cell comprise N bytes (for instance 54 bytes), the switching module provides the possibility to store sixteen cells into Cell Storage 1 and to retrieve sixteen cells from Cell Storage 1 in a set of N clock cycles.

Below will now be described with more details the Input and Output processes that are involved in the switching module 401.

1. INPUT PROCESS

The input process is involved for achieving the complete storage of a set of N bytes comprised in one elementary cell (considering that sixteen cells are actually being inputted simultaneously). The input process basically involves two distinct operations: firstly, the cells are entered into the data section via the sixteen receivers 10-0 to 10-15 as will be described below. This first step is achieved in a set of N clock cycles. Additionally, a second operation is performed for preparing the addresses within Cell Storage 1, or more exactly for computing the sixteen addresses that will be used within Cell Storage for the loading of the next set of sixteen cells that will follow next. In the preferred embodiment of the invention, this second Address computing step is achieved in a set of eight elementary cycles. The first cycle is used for computing the addresses used by input ports 0 and 1, while the second achieves the determination of the addresses that will be needed by ports 2 and 3 and, more generally, cycle n provides the computing of the two addresses within Cell Storage 1 that will be involved for inputting the cell coming through ports 2n and 2n+1.

In order to prepare the input operation, the free addresses of the Cell Storage 1 are provided by Free Address Queue 5 and loaded into the first set of ASA registers 20-0 to 20-7, and second set of ASA registers 21-0 to 21-7. For the sake of conciseness, hereafter when the ASA registers 20-0 to 20-7 are considered without any distinction, there will be used a single reference to "ASA registers 20". Similarly, the use of the reference to "ASA registers 21" will stand for the use of the eight ASA registers 21-0 to 21-8. When a distinction will have to be introduced, the normal reference to the registers 20-0 to 20-7 (or a reference to register 20-i) will be reestablished. This simplification will also be used in the remaining part of the description for the other groups of 0–7 or 0–15 individual elements, such as ARA registers 32-0 to 32-7, NRA registers 28-0 to 28-7 etc.

Now will be described the full loading of the ASA registers 20 and 21. As mentioned above, this is achieved by eight successive transfers of the addresses provided by FAQ circuit 5, via multiplexor 106, boundary latch 108, shadow latch 110, multiplexor 112, multiplexor 112, and pipeline register 114. For instance, the loading of 20-0 is achieved by a transfer of the address provided by FAQ circuit 5 (on bus 91), via multiplexor 106, latches 108 and 110, multiplexor 112, pipeline register 114 and NSA register 22-0. Thereafter, ASA register 20-1 is loaded by a similar transfer via its corresponding NSA register 22-1 etc.

Similarly, the loading of the set of ASA registers 21 is successively carried out via the multiplexor 107, boundary latch 109, shadow latch 111, multiplexor 113, pipeline register 115, and the set of eight NSA registers 23.

As mentioned above, multiplexors 106 and 107 have a second input which is connected to respectively receive the contents of the ASA registers 20 and 21. The use of the second input of multiplexors 106 and 107 allows the recycling of the addresses that are loaded into the ASA registers 20 and 21 (for instance ASA register 20-i, when the transfer is being performed during cycle i among the eight elementary cycles). It should also be noticed that the two sets of ASA registers form a whole group of sixteen registers that will be associated to the sixteen input ports of the switch module. The invention takes advantage of the arrangement of the set of ASA registers 20 and 21 in two groups of eight registers, each in order to reduce the number of elementary cycles that are required for computing the sixteen addresses used for the loading of the sixteen cells into Cell Storage 1. With only eight successive cycles, the invention provides the possibility of handling sixteen different input ports.

When the free addresses are loaded into ASA registers 20 and 21, the cell cycle which achieves the actual loading of the N_bytes cell into Cell Storage 1 can be initiated. Indeed, it appears that, for each input port, an address is made available into a corresponding one of the set of sixteen ASA registers. More particularly, the cell that is presented at an input port number 2n (that is to say, even since n is an integer between 0 to 7) will be loaded into Cell Storage 1 through the corresponding router 2-(2n) at a location whose address is defined by the contents of ASA register 20-n. The cell that is presented at an input port which is odd, that is to say number 2n+1 (with n being an integer between 0 and 7), will be loaded into Cell Storage 1 through router 2(2n+1) at a location that is defined by the contents of ASA register 21-n. From this arrangement, it appears the complete storage of a full cell of N elementary bytes requires a set of N elementary clock periods, while the control section allowing the storage of the ASA registers 20 and 21 requires eight elementary cycles. However, it should be noticed that since each router 2 is associated to a corresponding one among the sixteen ASA registers 20 and 21, sixteen cells can be simultaneously loaded into Cell Storage 1. More particularly, router 2-(2n) receives the output bus of the ASA register 20-n, while router 2-(2n+1) receives the output bus of ASA register 21-n.

It will now be described how the routing process of the incoming cell is being performed, simultaneously with the above mentioned loading of the ASA registers 20 and 21. In the preferred embodiment of the invention, this routing process is based on the use of a routing header that can be of one or two bytes.

When the header is limited to a single byte, the switch module according to the present invention operates differently in accordance with the Most Significant Bit (MSB) of the header. Indeed, as it will explained below, the switch is designed to operate in an unicast mode when the MSB of the one-byte routing header is set to zero, while it operates in a multicast mode when the MSB is fixed to one.

In unicast mode, the header is defined by the following format:

| bit 0 | !bit 1 | bit 2 | bit 3 | !bit 4 | bit 5 | bit 6 | bit 7 |
|---|---|---|---|---|---|---|---|
| 0 | ! module number | | | ! | port number | | ! | with the module number defining the accurate module that will route the cell and the port number defining the identification of the port to which the cell must be routed.

Conversely, when the MSB is fixed to a one—characteristic of the one-byte multicast mode—the seven remaining bits of the one-byte header are used as a multicast label which is used to determine the output ports to which the cell must be duplicated, as will be shown hereinafter.

In addition to the one-byte header, the switching module of the present invention is also designed to operated with a two-byte header. In this case, the sixteen bits of the latter are used to define the output ports where the cell will be duplicated. Indeed, each bit of the sixteen bits of the header is associated to one output port (e.g., the MSB corresponding to output port number 0) and every bit of the header that is set to a one indicates that the cell carrying this header will have to be duplicated to the output port that is associated to the considered bit. For instance, the MSB being set to "one" will cause the cell to be duplicated to output port 0, while bit number one set to a one will results in the same duplication to output port number 1 etc.

With the possibility of the use of different formats of headers, resulting in different modes, the switching module is allowed a great flexibility, only requiring adaptations of the microcode that is loaded into the switching module.

It will now be described in greater detail the unicast one-byte-header mode (the "Unicast mode" at section 1.1), the multicast one-byte-header mode (the "integrated multicast model" at section 1.2), and the two-bytes header mode (the "bit-map"mode at section 1.3).

Section 1.1.

Description of the unicast mode (unicast one-byte header mode)

The unicast mode is based on the use of the two sets of Holding Registers, 60 and 61 in FIG. 2, forming a whole set of sixteen Holding Registers. Simultaneously with the loading of the sixteen cells (formed of N bytes each), the one-byte header of each cell is loaded into the corresponding one among the sixteen Holding Registers 60 and 61 mentioned above. These sixteen Holding Registers (namely registers 60-0 to 60-7 and 61-0 to 61-7) hold the header as long as the entire loading process of the cells is not fully completed. In the arrangement of the present invention, the header of the cell that comes through port 2n is being loaded into Holding Register 60(n), while the header of the cell coming through port 2n+1 is loaded into Holding Register 61(n). The sixteen values that are loaded into these sixteen Holding Registers will be used by the control section of the switching module.

As it appears in FIGS. 2 and 3, each Holding Register 60-i is connected via an EVEN bus 150 to a control module 200, as well as to a Multicast Table Storage 6. Similarly, each Holding Register 61-i is connected via an ODD bus 151 to Control Module 200 and to Multicast Table Storage 6. Similar to the loading process of the ASA registers 20 and 21 that was described above, the access of the sixteen Holding registers 60 and 61 are achieved by eight successive elementary clock periods, each clock period providing access of a dual ODD-EVEN Holding Register to bus 150 and bus 151. More particularly, during clock period number 0, for instance, Holding Registers 60(0) and 61(0) respectively get access to EVEN bus 150 and ODD bus 151 in order to transfer their contents into Control Module 200. At the next clock period, the buses 150 and 151 are used for transporting the contents of the Holding Registers 60(1) and 61(1), and so on.

It should be noticed that the access of Holding Register 60(i) and 61(i) to Control Module 200 particularly permits the monitoring of the MSB of the header of each cell being inputted into the switching module. This particularly permits Control Module 200 to be aware of the accurate mode of the operation, either unicast or integrated multicast, that will be associated to each input port. For instance, should the header being loaded into Holding Register 60(i) carry a MSB set to zero, indicative of the unicast mode of operation, then the Control Module 200 will determine that the considered input port 2n will required an unicast processing. Conversely, if the MSB of Holding Register 61(i) carries a one, characteristic of the integrated multicast, then the Control Module 200 will cause the cell being associated to be processed according to the integrated multicast mode that will be described below. Therefore, it appears that the switching module of the present invention permits the sixteen input ports to operate quite independently, that is to say in different modes (either unicast or integrated multicast) in accordance with the contents of the routing header that is being transported by the considered input ports.

The Unicast routing process operates as follows:
Output Queue is formed of the sets 50 and 51 of eight queues each. Each individual OAQ queue of sets 50 and 51 is a dual input port of at least 64 bytes that is connected to EVEN bus 104 and ODD bus 105. Additionally each OAQ queue receives ODD Write-Enable and an EVEN Write-Enable control signals from Control Module 200. The sixteen sets of ODD and EVEN Write-Enable control leads form a 32-lead bus 210. Similar to the notation that was already employed above, each OAQ queue is associated to a corresponding one of the sixteen output ports of the switching module. Therefore, Output port number 2n will be associated to OAQ queue 50(n), while Output port 2n+1 corresponds to OAQ queue 51(n).

At a given instant (referred to as cycle n), the two input ports 2n and 2n+1 are processed as follows: Control Module circuit 200 gets access to the contents of Holding Registers 60(n) via bus 150 (i.e., the header of the cell on input port 2n) and the contents of Holding Register 61(n) (i.e., the header of cell received at input port 2n+1) via bus 151. The Control Module uses these headers for generating the appropriate ODD and EVEN Write-Enable control signals so that the contents of the ASA registers 20(n) and 21(n) are loaded into one or two of the sixteen OAQ queues 50 and 51.

More particularly, it should be noticed that Control Module 200 generates the Write-Enable control signals on bus 210 so that the contents of the ASA register 20(n) are loaded into the one of the sixteen OAQ queues 50 and 51 that corresponds to the output port, as determined from the contents of the header being transported and loaded into Holding Register 60(n), in accordance with the Port Number field that is defined by bits 4 to 7 of the one-byte header.

Simultaneously, the contents of ASA register 21(n) are loaded into the one of the sixteen output queues 50 and 51 that corresponds to the output port, as determined from the contents of the header being loaded into Holding Register 61(n), particularly bits 4 to 7 of the latter.

More precisely, considering the input port 2n for clarity's sake, should the contents of Holding Register 60(n) be equal to an integer 2p, the contents of ASA register 20(n) will be loaded into Output Queue 50(p). This will result, as will be described below, in the cell received in input port 2n being routed to the output port number 2p in accordance with the contents of the routing header being transported by the cell.

Should the contents of Holding Register 60(n) be equal to integer 2p+1, Control Module 200 generates the appropriate Write-Enable control signals on bus 210 so that the contents of ASA register 20(n) are loaded into OAQ 51(p), causing the cell that is received at input port 2n to be routed to output port 2p+1. Similarly, considering now input port 2n+1, should the contents of Holding Register 61(n) be equal to integer 2q, the contents of ASA register 21(n) will be loaded into Output Queue 50(q) (so that the cell will be transported to output port 2q). However, should the contents of Holding Register 61(n) be equal to 2q+1, then Control Module 200 generates the appropriate Write-Enable control signals so that the contents of ASA register 21(n) are loaded into Output Queue 51(q), so that the cell will be routed to output port 2q+1.

It may well occur that the two cells coming at input ports 2n and 2n+1, which are loaded into Storage 1, are to be directed to the same output port, for instance output port 2p (resp. 2p+1), according to the header being transported by the two cells. In this case, it appears that both Holding Registers 60(n) and 61(n) carry the same header, what results in the contents of the ASA register 20(n) and 21(n) being loaded into unique Output Queue 50(p) (resp. 51(p)). In the invention, this type of contention is advantageously solved by using a Dual-Port Storage for embodying each one of the sixteen output queues 50 and 51.

Section 1.2.

Description of the one-byte-header multicast mode (integrated Multicast).

The integrated multicast mode is based on the use of the two sets of Holding Registers, 60 and 61, forming a total of 16 registers. As above, the header of the cell coming at input port 2n is loaded into Holding Register 60(n), while that of the cell coming at input port 2n+1 is loaded into Holding Register 61(n). The loading of the sixteen Holding Registers 60 and 61 requires eight clock periods, as above, since two registers can be simultaneously loaded.

As mentioned above, by monitoring the MSB of the one-byte header that is incorporated into each cell, the Control Module 200 is made aware of the appropriate processing (unicast or integrated multicast) that has to be performed for every cell coming at one input port.

The integrated multicast routing process operates as follows: As above, the sixteen dual-port Output queues 50 and 51 of OAQ queue 4 are arranged so that output port 2n is being associated to queue 50(n) and output port 2n+1 is being associated to queue 51(n). At a given instant, during cycle n, the two input ports 2n and 2n+1 are processed as follows: the 7 Low Significant Bits (LSB) of the two headers that are respectively loaded into Holding Registers 60(n) and 61(n) (which corresponds to the multicast label as mentioned above) are simultaneously used for addressing Multicast Table Storage 6 via busses 150 and 151. This entails the execution of simultaneous reading operations of the dual-port memory used for embodying the Multicast Table Storage 6. Multicast Table Storage 6 presents two 16-bit data buses 152 and 153 which are respectively connected to a first 16-bit input bus of a multiplexor 64 and to a first 16-bit input bus of a multiplexor 65. Multiplexor 64 has a second input bus that is respectively connected to receive the contents of the two 8-bit Holding Registers 60(n) and 62(n) (resp. Holding Register 61(n) and 63(n) for MUX 65). The use of this second input bus of Multiplexors 64 and 65 will be more explained with respect to the description of the bit-map multicast mode. Multiplexors 64 and 65 have a 16-bit output bus that is respectively connected to a dedicated port (so called MultiCast or MC) of Control Module 200.

The results of the two simultaneous reading operations of Storage 6 are presented to Control Module 200 via multiplexors 64 and 65, respectively. It should be noticed that the control of all the multiplexors that are used in the switching module of the present invention is achieved by means of general control device such as a general microprocessor (not shown in the figure). Therefore, for the input ports which are identified by Control Module 200 as requiring the integrated multicast processing, the latter use the contents of the Multicast tables that are passed through multiplexors 64 and 65 via busses 154 and 155 respectively, to generate the appropriate Write-Enable control signals on bus 210 so that the contents of the ASA registers 20(n) and 21(n) are loaded into the appropriate queues 50 and 51 that correspond to the output ports involved for the multicast operation.

This is achieved as follows: according to the multicast label that is carried by the header of input port 2n, loaded into Holding Register 60(n), the result of the reading operation performed in Multicast Table Storage 6 provides a 16-bit word that is presented on bus 152. Each of the sixteen bits forming this word is associated to one output port of the switching module. For instance, the MSB is affected to correspond to the output port number 0 that is associated to OCD driver 11(0), while the LSB corresponds to the output port 15. Therefore, the sixteen bits of the word presented on bus 152 define the different output ports to which the cell carrying the considered one-byte header will have to be duplicated. Should the cell be duplicated in the EVEN output ports (i.e., ports 0, 2, 4, . . . , 14), then the word will be X'AAAA (in hexadecimal). Should the cell be duplicated in all output ports (corresponding to a so-called broadcast multicast), then the word will be X'FFFF.

More generally, Control Module 200 generates the Write-Enable control signals on bus 210 so that the contents of ASA register 20(n) are loaded into the group of appropriate queues, among the sixteen output queues 50 and 51 of block 4, that correspond to one output port which is determined by the word transported on bus 152. Simultaneously, the contents of register 21(n) are loaded into the group, among the sixteen output queues of OAQ block 4, that corresponds to the output port determined by the value carried by bus 155. More precisely, during cycle n, considering the bit number 2p of bus 154, if the latter appears to be set to a "ONE", this will cause the contents of ASA Register 20(n) (corresponding to input port 2n) to be loaded into output queue 50(p). This will result in the duplication of the cell onto output port 2p. Considering now bit number 2p+1 of bus 154 during the same cycle n, if the latter is set to a "ONE", this will be interpreted by Control Module 200 as a need for loading the contents of ASA register 20(n) (still corresponding to input port 2n) to be transferred into OAQ output queue 51(p). This will result in the duplication of the cell incoming in input port 2n at output port 2p+1. This mechanism permits the duplication of one cell (incoming in input port 2n in the considered example) at any combination of the output ports.

Considering cycle n and bit number 2q of bus 155, if the latter is set to a one, this will result in Control Module 200 causing the contents of ASA register 21(n) (corresponding to input port 2n+1) to be transferred into output queue 50(q). As above, this will result in the duplication of the cell arriving at input port 2n+1 to the output port 2q. Similarly, if the bit number 2q+1 of bus 155 is set to a one during cycle n, the contents of ASA register 21(n) will be loaded into output queue 51(q), resulting in the duplication of the cell at the output port 2q+1.

It appears from the above described mechanism that it could well occur that the two cells that arrive at input ports 2n and 2n+1 each contain a header that corresponds to a broadcast operation, in which case the duplication of the cells are requested for all the output ports. In this very particular case, during cycle n of the eight clock periods needed for processing the sixteen ports, the two busses 154 and 155 appear to convey the same information, i.e., X'FFFF (in hexadecimal). Control Module 200 will simultaneously generate the 32 Write-Enable control signals on bus 210, thus causing loading of the contents of the two ASA registers 20(n) and 21(n) processed during cycle n, into the sixteen OAQ output queues 50 and 51. Since these queues are embodied by means of a dual-port storage, it appears that any contention is advantageously solved.

Next, a specific operation is involved for preparing the output process associated with the two addresses which were transferred from ASA registers 20(n) and 21(n). This mechanism involves the use of the Book Keep Memory circuit 7. Indeed, during cycle n, the address defined by the contents of the ASA Register 20(n), presented on bus 104, are used as an address for addressing the Book Keep Memory 7 and for therein storing the actual number of times that the considered address in ASA 20(n) was stored into Output Queue 4 (that is to say, the number of duplication which must be performed for the considered cell being loaded into Cell Storage 1). More particularly, for an unicast operation, the value which is loaded into Book Keep Memory 7 at the address defined by the contents of ASA register 20(n) will be equal to 1. In the case of a multicast operation on the cell arriving on port 2n, the value which is loaded will represent the number existing on bus 154, that is to say the number of times that the cell will be duplicated on the output ports.

Simultaneously, the address that is loaded into ASA Register 21(n), during cycle n, is processed in the same way. Therefore, for an unicast operation on input port 2n+1, the value which is loaded into Book Keep Memory 7 at the address defined by the contents of ASA register 21(n) will be equal to 1; while, in a multicast operation, that value will be equal to the actual number that exists on bus 155.

Section 1.3.

Description of the two-bytes header multicast mode (bit map mode).

In the bit map mode, the multiplexors 64 and 65 are switched at their alternate position contrary to the one-byte header mode (thanks to some internal control device not shown on the figure). Therefore, it appears that the data can be directly transferred from bus 156 to bus 154, and similarly data that appear on bus 157 can be directly transferred to bus 155. The bit-map mode is based on the use of Holding Registers 60, 61, 62 and 63, thus forming a whole set of 32 registers of eight bits each.

The two-bytes header of the cell that comes through input port 2n is loaded into Holding Register 60(n) and 62(n), while the header of the cell arriving at input port 2n+1 is loaded into Holding Register 61(n) and 63(n). The full loading of the 32 Holding Registers requires a set of eight successive cycles. In the bit map mode, the Multicast Table 6 and busses 150, 151, 152 and 153 are not used. Further, an initialization period is involved for setting the Control Module 200 into this bit map mode, so that the latter can then use the 16-bit words that are presented on busses 154 and 155, respectively coinciding with the two-bytes headers of the cells arriving at input port 2n and 2n+1, for generating the appropriate Write-Enable control signals on bus 210. This results in the contents of ASA registers 20(n) and 21(n) being loaded into the appropriate queues 50 and 51 that correspond to the accurate output ports involved for the multicast operation, as described above for the integrated multicast mode in section 1.2.

In the particular case where an unicast operation is to be performed on one cell arriving at input port 2n, it should be noticed that the two-byte header will have one unique "1", which location among the sixteen bits accurately will accurately define the target output port where the cell will be routed.

Finally, the Book Keep memory is similarly processed as above, for the purpose of preparing the output process that will use the particular addresses that were loaded into ASA registers 20(n) and 21(n).

THE OUTPUT PROCESS

2. Description of the output process performed by the switching module.

The output process is independent from the input process and involves two distinctive phases. A first preliminary phase is first initiated, which requires a succession of 8 successive cycles. During cycle n, there is simultaneously prepared the operation for the output ports 2n and 2n+1. The first phase allows the loading of the sixteen ARA Registers 32 and 33. This is achieved as follows: during cycle n, the address loaded into Output Address Queue 50(n) is extracted and transported to NRA Register 28(n) via boundary latch 30, shadow Register 34 and Multiplexor 26 (controlled by an internal processor not shown in the figure). Simultaneously, the address that is loaded into Output Address Queue 51(n) is extracted and conveyed to NRA Register 29(n) via boundary latch 31, shadow Register 35 and Multiplexor 27. It therefore appears that the loading of the sixteen NRA Registers 28 and 29 requires a set of eight elementary clock cycles. When these eight cycles are completed, the contents of each NRA Register among the sixteen ones 28 and 29 are simultaneously loaded into the corresponding one among the sixteen ARA Registers 32 and 33. This loading completes the first initialization phase.

The second phase can then be initiated. The sixteen addresses which are now available in ARA Registers 32 and 33 are presented to their corresponding Output Routers 3-0 to 3-15. Each Router will then perform the appropriate connection of its corresponding output port to the one location, among the 128 locations within Cell Storage 1, designated by the address defined by the contents of the corresponding ARA Register 32 or 33. More particularly, each Router 3(2p), with p=0 to 7, performs the connection of output port 2p to the appropriate location within Cell Storage 2, as defined by the contents of ARA Register 32(p). Simultaneously, every Router 3(2p+1), with p=0 to 7, performs the connection of output port 2p+1 to the appropriate location in Storage 1, as designated by the contents of ARA Register 33(p). Therefore, it appears that the sixteen Retrieve operations can be simultaneously performed and sixteen cells can be routed towards the sixteen OCD drivers 11, allowing a very effective switching mechanism. It should be noticed that full extraction of the cells requires a number of N clock periods.

At the completion of the output process, the sixteen addresses that are contained in the ARA Registers are transferred into corresponding locations of a set of sixteen Old Retrieve Address (ORA) registers 24(0) to 24(7) and 25(0) to 25(7). This is achieved by a single transfer of the contents of ARA Registers 32(n) and 33(n) into ORA Registers 24(n) and 25(n).

It should be noticed that in the preferred embodiment of the present invention, the dual transfer of the contents of NRA Registers 28(n) and 29(n) into the corresponding ARA Registers 32(n) and 33(n) is simultaneously achieved with the dual transfer of the contents of ARA Registers 32(n) and 33(n) into ORA registers 24(n) and 25(n).

The process then proceeds to a recycling of the addresses of Cell Storage 1, which becomes available again because of the possible extraction of the cells which were therein loaded. This process uses the Book Keep Memory 7 in order to take into account the possibility of multiple booking when in multicast mode. Indeed, in the case of multicast cells, the invention prevents that the first retrieve operation performed on this cell results in the availability of the considered location into Cell storage 1 until the last duplication of the cell be actually completed. Also, the process used in the present invention takes into consideration the fact that, should a cell be duplicated three times at three distinctive output ports for instance, the three retrieve processes might well not occur at the same instant for each output port. The difference in the actual retrieve operation of the same cell obviously depends upon the actual loading of the OAQ queue that corresponds to the output port being considered, that is to say the actual traffic of the output port.

The recycling process requires a set of eight elementary cycles performed as follows: during cycle n, the contents of ORA Register 24(n) are presented via bus 158 to the Free Address Queue (FAQ) circuit 5 and to the Book Keep Memory circuit 7. For the address which is considered, and defined by the value carried by bus 158, Book Keep Memory 7 provides the number of remaining reservations, that is to say the number of times the cell stored in the considered location should be still retrieved. This number is then reduced by one and a test is performed on the result. If the result is not equal to zero, the latter is loaded again into the storage of Book Keep Memory circuit 7 at the same address. However, if the result of the decrementation appears to be equal to zero, indicating that the retrieve operation corresponds to the last duplication that was requested by the header, this result is also reloaded into the internal storage of Book Keep Memory circuit 7, at the same address, and, additionally, circuit 7 generates a Write-Enable control signal on lead 160 in order to load the address existing on bus 158 into the internal storage of FAQ circuit 5. The latter is therefore registered as an available location of further cell storage operation.

The same process is simultaneously performed for the value of the address that is stored into ORA register 25(n) which is presented via bus 159 to the input bus of both FAQ circuit 5 and to the Book Keep Memory circuit 7. Similarly as above, if the result of the decrementation by one, which is performed on the value being loaded into circuit 7 at the address carried by bus 159, appears to be equal to zero, then circuit 7 generates a Write-Enable control signal on lead 161 to FAQ circuit 5 so as to load the considered address into the internal storage of the FAQ circuit 5. When this is completed, the considered address is made available again for further cell storage operations, as described in section 1 relating to the input process.

It should be noticed that the invention takes great advantage of the use of Dual-Port storage for embodying the internal storage of the two circuits 5 and 7. Indeed, this particularly allows the possibility to reduce by two the number of cycles which are necessary for processing the different addresses within Cell Storage 1. In the invention, only 8 elementary cycles are required for providing a 16-input and 16 output port switching module.

Figure 4:
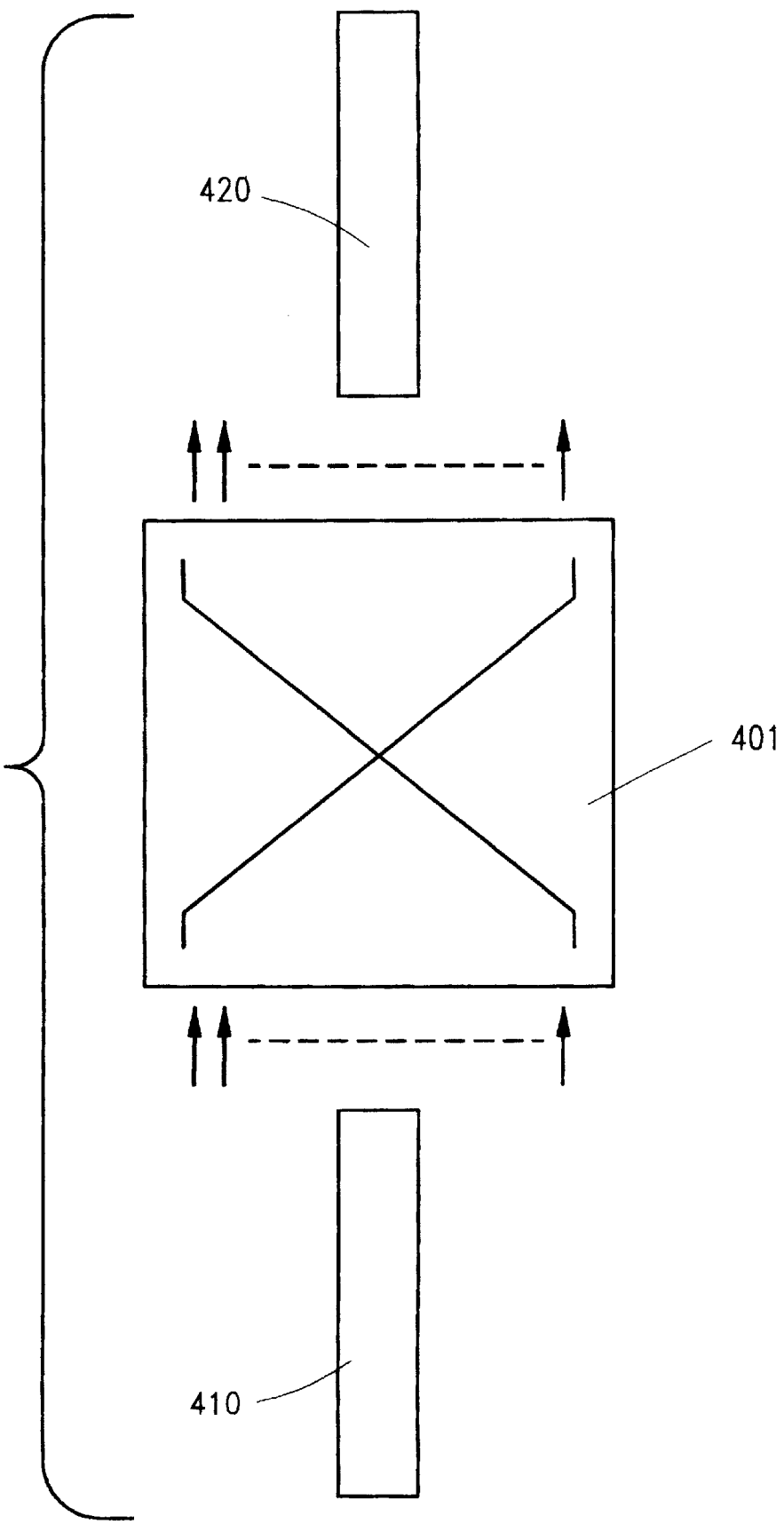
FIG. 4 illustrates the use of a single switching module for carrying out a switching apparatus.

FIG. 4 illustrates the use of a single switching module 401 of the present invention in order to provide a switching apparatus. As shown in the figure, a particular cell 410 is received by the switching module 401 and routed in accordance with the routing process that was described above. The cell, represented with reference to arrow 420, is made available at the appropriate output port of module 401. In this figure, the switching apparatus, that will hereinafter called the switch fabric, is comprised of one single module 401 and operates at a speed which is basically fixed by a given technology. However, there will be requirements of higher speeds in a single stage architecture. The switching module of the present invention permits higher speeds to be attained even with the same technology. This is advantageously permitted by a particular arrangement of identical switching modules 401 (which will now be described with more detail) and which allows a very simple and effective possibility of aggregating multiple different switching modules in a so-called speed expansion mode.

Figure 5:
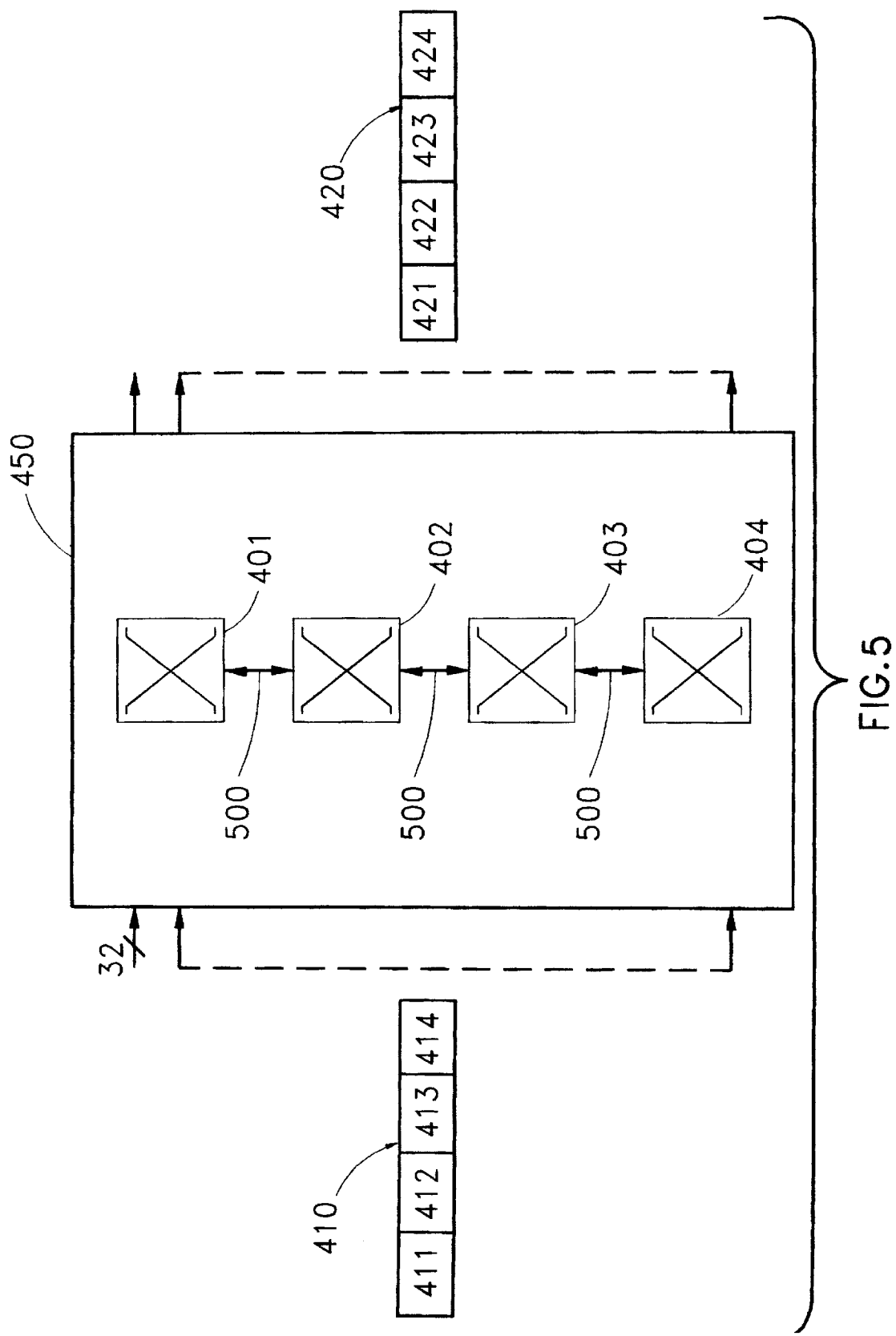
FIG. 5 illustrates the use of multiple switching modules arranged in port speed expansion for carrying out an enhanced switching structure operating at higher speed.

FIG. 5 illustrates an arrangement where four different switching modules 401–404 are aggregated in order to constitute a more powerful switching structure 450 which operates at a higher speed. In this arrangement of four switching modules 401–404, each cell 410 that is presented to an input port p of aggregate switching structure 450 is logically divided, or sliced, into four distinctive parts 411, 412, 413 and 414. The first part 411 of the cell is presented to the input port p of module 401, while the second part 412 is entered into port p of module 402. Similarly, the third and fourth part 413 and 414 of the cell are respectively presented to the input ports p of switching modules 403 and 404. As it will appear below, the internal design of the switching modules 401–404 permits such arrangement to be advantageously made, so that the four distinctive parts of the cell 410 are simultaneously processed. On the other side, the cell will be retrieved and routed towards the appropriate output port of each switching module 401–404. More particularly, the first part 421 of cell 420 will be routed at the appropriate output port q of switching module 401, while the second part 422 of cell 420 will be forwarded to the appropriate output port q of switching module 402. Similarly, the third and fourth parts 423 and 424 of the cell will be respectively presented at the appropriate ports q of the switching modules 403 and 404.

It obviously appears that the simultaneous processings of the four distinctive parts of cell 410 results in a decrease by four of the size of the cell that is actually processed by each individual switching module. Therefore, the four switching modules are fully combined so as to multiply by four the effective speed of the switching structure. This arrangement entails a substantial advantage since it becomes possible, for a given technology, to virtually increase the speed of the switching process. As it will be explained hereinafter with more details, the substantial increase in the speed is made possible by simply aggregating multiple switching modules of FIGS. 2 and 3. As the cell cycle will be reduced by a factor of four for any switching modules 401–404, it appears that the sole limit for aggregating multiple switching module in order to carry out a more powerful switching structure 450 resides in the need to execute, with the possibilities given by the given technology, the eight elementary clock cycles that are required for both the input and output processes described above. In the present invention, the enhanced switching structure 450 is based on four switching module 401–404 and the description will be fully made for this particular arrangement. However, it should be noticed that one skilled in the art will straightforwardly adapt the description below for any other combination of switching modules.

In the arrangement of the preferred embodiment, it appears that switching module 401 is presented with the first part of cell 410, that is to say part 401 that includes the routing header used for controlling the routing process as was described above. Therefore, switching module 401 will be used as a master module within the aggregate structure 450, that is to say that the control section of module 401 will operate for the whole set of four switching modules 401–404. The three other switching modules 402–404 will operate as slaves for the routing process, so that the four distinctive parts constituting the output cell 420 will simultaneously appear at the same output port(s) q. Since the storage process inside Cell Storage 1 of the master switching module 401 operates randomly, depending upon the storage locations that are available at a given instant, it is quite necessary to make sure that the same storage process be performed inside the slave switching modules 402–404 in order to ensure the integrity of the cell that is routed through the four switching module. In the invention, this is advantageously ensured by use of a specific speed expansion control bus 500 that is under control of master switching module 401.

In the preferred embodiment of the invention, Speed Expansion bus 500 is a 32 bit bus which is made of four distinctive parts. Speed Expansion bus 500 includes a first set of eight leads 510-0 to 510-7 that are respectively connected to the input of receivers 44-0 to 44-7, and to the output of drivers 40-0 to 40-7 described above with respect to FIG. 2. Additionally, Speed Expansion bus 500 comprises a second set of eight leads 509-0 to 509-7 that are respectively connected to the output lead of the eights drivers 41-0 to 41-7, also respectively connected to the input lead of the eight receivers 45-0 to 45-7 described above.

Further, Speed expansion bus 500 comprises a third set of eight leads that are connected to bus 520 (that is to say to the input lead of the eight receivers 46 and to the output of drivers 42), and a fourth set of eight leads that are connected to bus 521 (i.e., to the input lead of the eight receivers 47 and to the output of the eight drivers 43 (see, FIG. 3).

Therefore, it appears that Speed Expansion bus 500 realizes the full connection between the four switching modules forming the switching structure. The Speed Expansion mode then operates as follows:

In the master module 401, the different OCD drivers 40, 41, 42 and 43 are enabled. Thus, they provides the routing data that will be conveyed through bus 500 to the other slave switching modules 402–404. Also, Multiplexor 112 (resp. Multiplexor 113) is controlled (by internal processor not shown) so that the contents of register 110 (resp. register 111) are transmitted to pipeline register 114 (resp. pipeline register 115). Multiplexor 26 (resp. multiplexor 27) is configured so that the contents of register 34 (resp. 35) are is transmitted to NRA registers 28 (resp. NRA registers 29) since, in this case, no pipeline register is being used.

In the slave switching modules 402–404, the different OCD drivers 40, 41, 42 and 43 are disabled. Multiplexor 112 (resp. Multiplexor 113) is controlled so as to connect the output of Boundary latch 180 (resp. Boundary latch 181) to the pipeline register 114 (resp. pipeline register 115) via the EVEN bus (resp. the ODD bus). On the other side, Multiplexor 26 (resp. Multiplexor 27) is configured so as to connect the output of Boundary latch 80 (resp. Boundary latch 81) to the set of NRA registers 28 (resp. NRA registers 29). Therefore, at each cell cycle, the ASA registers, 20 and 21, and ARA registers, 32 and 33, of every switching module 401–404 will contain the same data, thus ensuring the same routing process in the four component of the aggregate switching structure. This achieves a strictly identical routing process being performed inside the four distinctive switching modules and permits that the four distinctive parts of the cell 410 will simultaneously appear at the same appropriate output ports of the modules 401–404. The full synchronism is particularly achieved by the use of boundary and shadow latches 110, 111, 80 and 81.

It therefore appears that the switching module of the present invention can be easily aggregated with other modules in order to achieve a powerful switching structure operating at high speeds. Although the above description was based on the use of four individual switching modules 401–404, it should be noticed that other arrangements can be achieved. Indeed, the possibility of aggregating similar modules is obviously not limited to four. When using two modules operating in speed expansion mode, the switch speed can be increased by a factor of two.

The performance of the switching structure, either based on two, four or more switching modules 401, is still enhanced in the present invention by means of a use of specific circuits which are designed to satisfy the numerous requirements that are existing in the market. Indeed, the invention takes advantage of a set of adapters that provides, in addition to the cell slicing that is required for dividing the cell into four parts (in the preferred embodiment of the invention), the different interfaces that are needed by the wide variety of customers. Thus, the invention achieves a highly flexible switching system that can meet most switching requirements.

Figure 6:
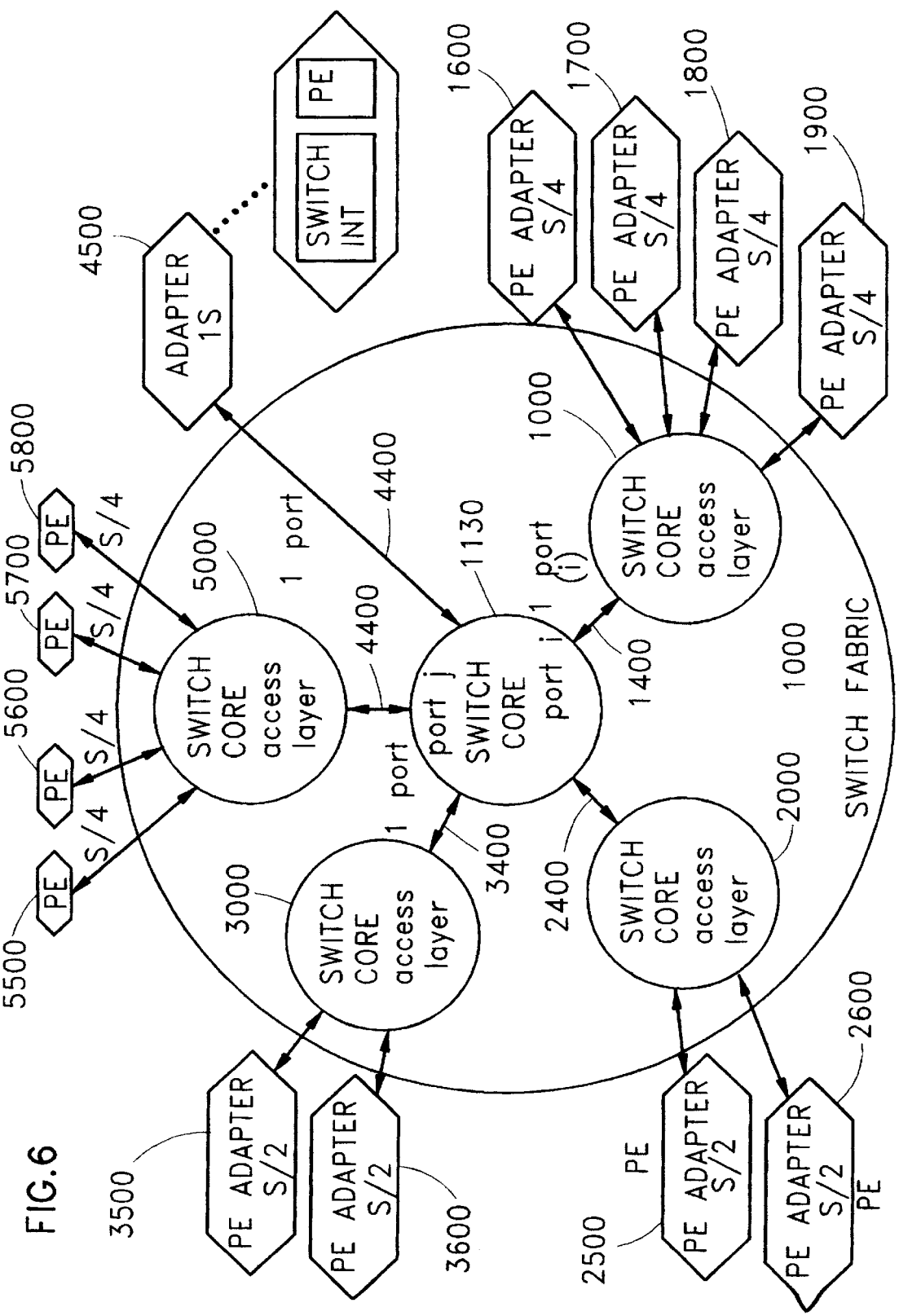
FIG. 6 illustrates a general switch fabric including a switch core, based on the switching structure of FIG. 5 associated with Switch Core Access Layers elements.

FIG. 6 shows an example of an switching architecture, based on high speed switching structure 450, that achieves a wide variety of lines attachments. Switch core may be located in one building and provides to a set of N different input and output telecommunication ports (sixteen ports in the embodiment of the invention). One port providing a 1.6 Gigabit/s telecommunication link may be used for providing a high speed communication link (represented in reference to arrow 4400) with an adapter 4500. Switch core 1130 has a 1.6 Gigabit/s port i that provides a telecommunication link 1400 to a Switch Core Access Layer (SCAL) element 1000. SCAL element 1000 provides attachment to four Protocol Engine adapters 1600, 1700, 1800 and 1900 that each provide an s/4 communication link. A third port of switch core 1130 is dedicated by link 2400 to another SCAL element 2000, which provides with the attachment to two s/2 Protocol Engines adapters, 2500 and 2600. A similar attachment may be provided by means of a an additional SCAL element 3000 attached to two PE adapters 3500 and 3600 sharing the 1.6 Gigabit/s communication link 3400 provided by switch core 1130. At last, in the example illustrated in the figure, a SCAL element 5000 allows attachment to four s/4 Protocol Engines 5500–5800 which provides access to the 1.6 Gigabit/s dataflow of port j of switch fabric 450 via link 4400. In the preferred embodiment of the invention, SCAL elements 1000–2000 and 3000 take the form of electronic packages to which are attached the different Protocol Engines, in the form of electronic cards.

As it will be shown hereinafter with more details, the invention provides two distinctive embodiments of the general architecture, one example of which is illustrated in FIG. 6. Indeed, depending on the requirements of the customer, the switch fabric may take two distinctive forms: a first so-called compact switch fabric architecture and a second so-called distributed switch fabric architecture.

The first embodiment of the invention, referred to as the compact switch fabric architecture, is used when a high flexibility and powerful switch is need in a close, compact area. In this case, the switch core 1130 and the different SCAL elements 1000, 2000, 3000 and 5000 are located in the same restricted physical area by means of direct 1.6 Gigabit/s communication link, based on the use of coaxial cables.

In the most general cases, however, the lines attachments are located in different physical areas of an industrial set of buildings. In this case, the invention permits the SCAL elements to be located far enough from the switch core 1130 (e.g., up to 100 meters) by means of 1.6 Gigabit/s communication links 1400, 2400, 3400 which are each based on a set of optical fiber communication links, at least four 500 Mbits/s optical links for the data. This results in simple connections being performed for the attachment of the different elements forming the switching architecture (i.e., the so-called "switch fabric").

Figure 7:
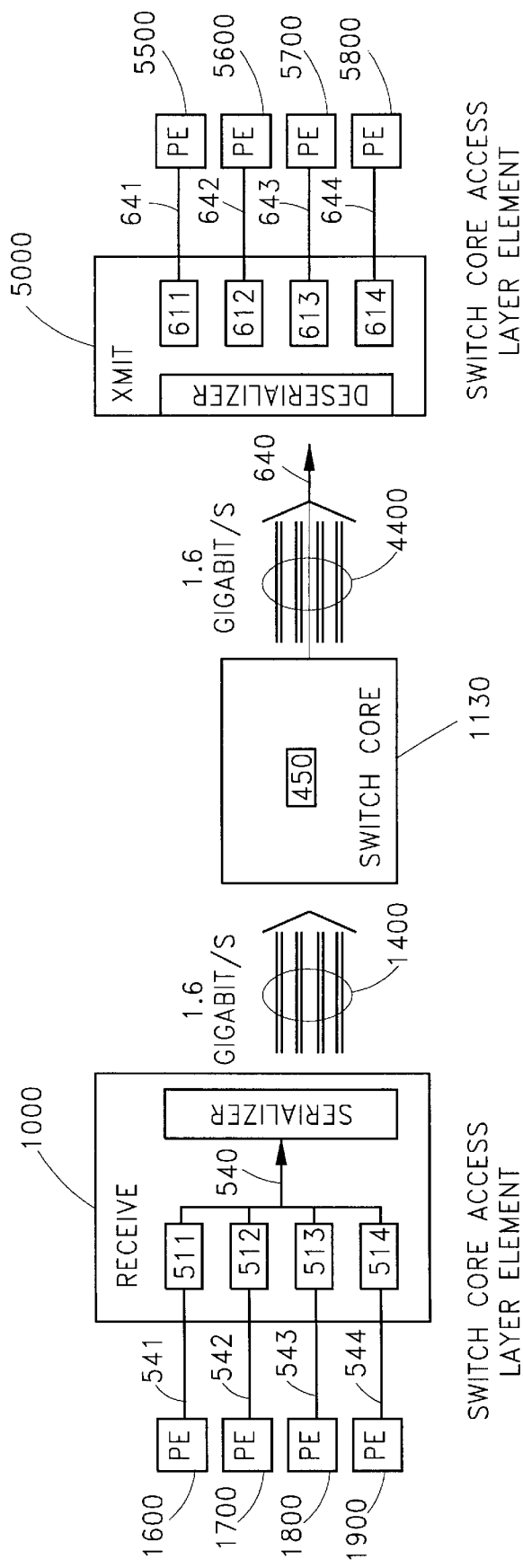
FIG. 7 illustrates the logical flow of the distributed switch core fabric embodiment.

The structure of the receive and transmit part of each SCAL element 1000–5000 is illustrated with respect to FIG. 7 showing the logical dataflow between receive part of SCAL element 1000 (communicating through port i of switch core 1130) and the transmit part of the SCAL element 5000 that is attached to port j of switch core 1130. This figure particularly illustrates the above mentioned distributed embodiment of the switch fabric where each Switch Core Access Layer, layer element 1000–5000, is located from the switch core 1130 by a distance being at least up to 100 meters. The receive and transmit part of one SCAL element will now be particularly described and it will be assumed that this SCAL element is provided with the attachment to four Protocol Engines. However, it be noticed that the SCAL structure of the invention is not limited to this particular arrangement of four Protocol Engines. Protocol Engines 1600–1900 may provide attachment to two OC3/STM1 links each according to CCITT Recommendations for instance, or alternatively to eight DS3 communication links. In the present invention, each Protocol Engine being connected to a SCAL element is associated with one so-called PINT element. With respect to the receive part of the SCAL element 1000, PE 1600 (resp. PE 1700, PE 1800, PE 1900) is associated with a PINT element 511 (resp. 512, 513, 514) via bus 541 (resp. 542, 543 and 544), while with respect to the transmit side of SCAL element 5000 (attached on port j), PE 5500 (resp. 5600, 5700, 5800) receives data cells from a PINT 611 (resp. 612, 613, 614) via bus 641 (resp. 642, 643, 644). Should the number of Protocol Engines attached to a SCAL element (for instance SCAL 2000) be limited to two, then the latter will only include a set of two PINT circuits. Additionally, the SCAL elements are fitted with serializer/ deserializer circuits allowing the conversion of the data flow so as to reduce the number of coax cables (in the compact switch core) or optical fibers (in the distributed switch core).

Thus, FIG. 7 illustrates the logical flow of data between two determined ports, for instance port i on the receive side and port j on the transmit side. Therefore, each element appearing at the left of the switching structure 450 should bear an indicia i indicating its correspondence to the port number i. Similarly, every element appearing on the right side of block 450 should bear an indicia j for expressing the destination output port j. However, for clarity's sake the indicia will be suppressed in FIG. 6 for simplifying the description below. The use of the indicia will, however, be introduced in FIG. 9 when considering the multicast description of the enhanced switching system.

It should be noticed that the general term of "Protocol Engine" designates the line adaptation layer of the different lines that exists on the market. Basically, this term stands for hardware and software functional components that are well known to the skilled man and that provide the line interface adaptation to the different lines used by the customers. Such lines may include lines carrying ATM protocols, T3, DS3, AT1, E1, and interfaces such as FCS, ESCON etc. Such a system can be, for instance, the "Trunk Port Adapter" that is marketed by IBM for the NWays 2220 module 500.

A particular improved ATM protocol Engine will be described in detail in reference with FIGS. 14 to 17. However, whatever the particular type of line being interfaced, it should be kept in mind that the Protocol Engine is used for interfacing the line used by the customers and for providing SCAL element 1000 with cells that are intended for the switch core 450, the cells comprising a routing header and a payload. The routing headers of the cells are used in accordance with the above described routing mechanism.

Figure 8:
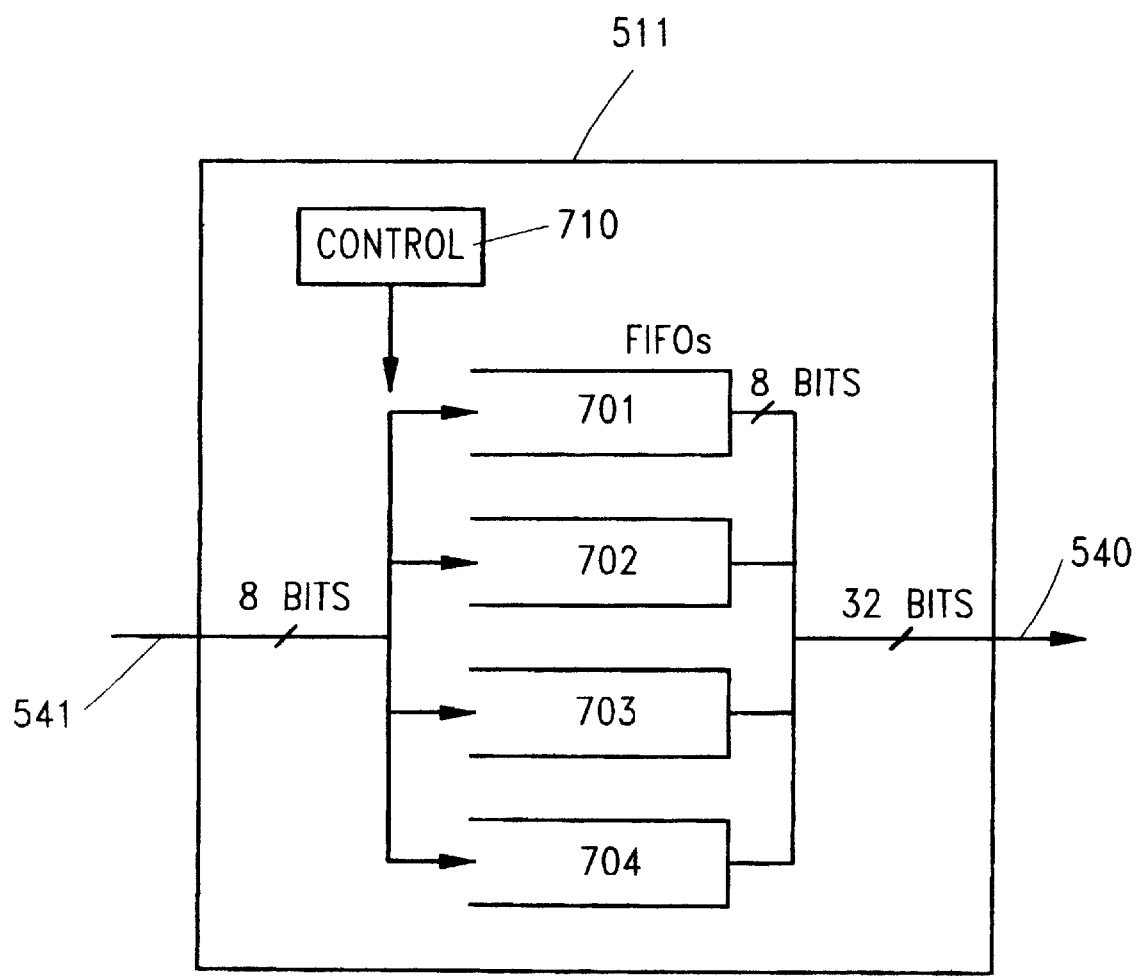
FIG. 8 shows the PINT receive part of SCAL of the present invention.

FIG. 8 shows the structure of any one segment of the receive part of PINT circuit 511–514 of the Switch Core Access layer element 1000. The dataflow coming on 8-bit input bus 541 is distributed through four FIFO storages 701–704 so that the first byte is entered into FIFO 701, the second one into FIFO 702, the third one into FIFO 703, the fourth one into FIFO 704, the fifth one into FIFO 701 again, etc. Therefore, the 8-bit data flow is transformed into a four-byte output bus 540 that is needed by the four switching modules of structure 450. In the so-called compact switch fabric embodiment, each byte is transmitted by means of the serializer/deserializer and a common coaxial cable; while in the distributed switch core, each byte uses the path formed by the serializer/deserializer and a longer optical fiber. Therefore, bus 540 is provided with four flows of bytes that are directed to the four sets of receivers of each of the individual switching modules.

For both the compact and distributed embodiments of the switch fabric, it should be noticed that the first byte of bus 540 (the 8 MSB) is intended to be transmitted to the 8-bit input bus of receiver 10 at the appropriate input port of the first module 401. Similarly, the second byte of bus 540 (bits number 9 to 15) is transmitted to the input of receiver 10 at the appropriate input port of the second switch module 402, etc. The cell being received at the input port 541 of element 511 in N cycles is approximately presented at the input of the four switching modules 401–404 in N/4 cycles. In the preferred embodiment of the invention, the cell which arrives at input bus 541 has 58 bytes. This set of 58 bytes is completed by two additional bytes that are incorporated at appropriate locations within the cell in order to form a 60-byte cell which, when distributed through the four FIFOs, provides a succession of 15 sets of 4-byte words that can be processed by the switching modules 401–404. The two extra bytes which are added to the 58 original bytes are used in conjunction with the above described "bit-map mode" or "two-byte header multicast mode". To achieve this, and assuming that the switching module that operates as a master is module 401, a control circuit 710 provides the incorporation of the two bit-map bytes at the first and second location within FIFO 701 (that is to say at the first and fifth position of the cell being received on bus 541). Therefore, switching module 401 receives the two bit-map bytes forming the routing header at the first locations of the data flow coming at its input port. It should be noticed that the speed on the two busses 541 and 540 are largely independent since the former may be lower than the latter. Assuming that the switch operates at a speed of 20 nanoseconds (corresponding to an aggregate data flow of 1.6 gigabits/s), the higher speed that is permitted on bus 541 appears to be 60/58×20 nanoseconds. In addition to the PINT circuits, the SCAL element 1000 further includes control logic that provides control of the four "Enable-Output" input leads (not shown) of PINT circuits 511–514 so that aggregate switching structure 450 can successively process the cell received by circuit 511 (requiring fifteen cycles in the preferred embodiment), then the cell received by element 512, then that received by element 513 and so on. In this way, each PINT circuit 511–514 gets an access of the fourth of the bandwidth of the bus 540.

Figure 9:
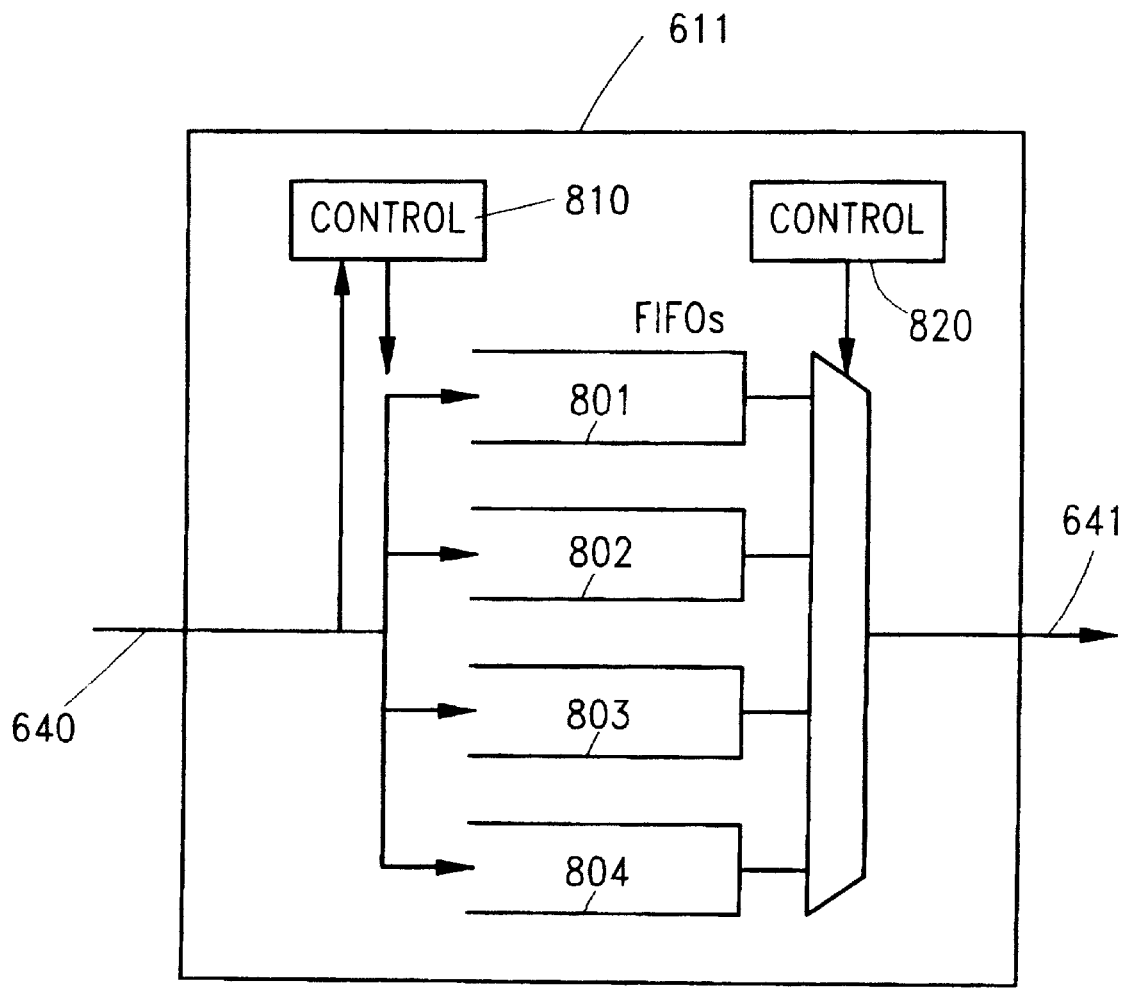
FIG. 9 shows the PINT transmit part of the SCAL of the present invention.

FIG. 9 illustrates the structure of the four transmit parts of PINT circuits 611–614. Each PINT element 611–614 receives the totality of the 32-bit bus 640. The latter receives the four parallel flows of serialized bytes that are received from the four coaxial cables separating the switch core from the SCAL (in the compact embodiment) or from the four optical links (in the distributed switch fabric where the different SCALs are located at different physical areas with respect to the switch core 1130). Each PINT element 611 is fitted with a set of four FIFOs 801–804 that presents a storage capacity that is far higher than that of the FIFO used for the receive part. In the preferred embodiment of the invention, the ratio between the FIFO storages 801–804 and the FIFO storages 701–704 is fixed to at least 250 in order to ensure high buffering when many cells are to have the same destination output port.

Considering for instance transmit block 611, a control module 810 receives the data coming from bus 640 and extracts the "bit map" two bytes from the cell being received. From the value that is currently carried by these two bytes, control module 810 determines whether the cell has to be loaded into a set of four FIFO registers 801–804, or discarded. In the first case, Control Module 810 generates a load control signal which allows each of the four bytes carried by the 32-bit bus 640 to be loaded into its corresponding FIFO register 801–804. For instance, the first byte appearing on bits 0–7 of bus 640 will be loaded into FIFO 801, while the second byte (bit 8–15) will be transferred into FIFO 802 and so on. In the second case, if the cell appears to be discarded by the considered transmit block, then Control Module 810 does not generate the load control signal, thus preventing the loading of the cell into the FIFO registers.

Any one of the four elements 611 to 614 receives the same cells which appear on the common bus 640. However, since the two-byte "bit-map" header is used by each of the elements 611 to 614 in order to control or not the loading of the considered cell into the internal FIFO queues, it appears that this header also realizes a multicast operation that still permits the duplication of the cell coming on bus 540 to multiple output directions. In the preferred embodiment of the invention, the first bit of the header is used by Control Module 810 in order to determine whether the cell has to be duplicated to the output bus 641, while the second bit of the two-byte header is used by the Control Module of element 612, and so on.

In each block 611–614, the four FIFOs are accessed by a Control Module 820 which is used for regenerating the sequence of the different bytes forming the cell on a 8-bit bus 641. Additionally, control Module 820 provides the removal of the "bit map" two-byte header so that the cell becomes identical to the one that was received by the receive part of the SCAL circuit 1000. In the preferred embodiment of the invention, this is simply achieved since the "bit-map" header always occupies a fixed position within the 60 bytes forming the cell.

The Protocol Engines 5500–5800 are then provided with the appropriate train of cells generated by the blocks 611–614. It should be noticed that the invention provides two independent embodiments that both provide wide flexibility because of the efficient cooperation between the powerful switching structure 450 and the different SCAL elements being attached to every port. In one embodiment, it was shown that the SCAL elements are all located close to the switch core 1130, thus providing a compact switching architecture. In the second embodiment, where numerous line adapters attachments are required in a wide industrial area, the invention uses the serializer/deserializer in association with optical fibers so as to achieve links that can service an area which is at least 100 meters long.

Figure 10:
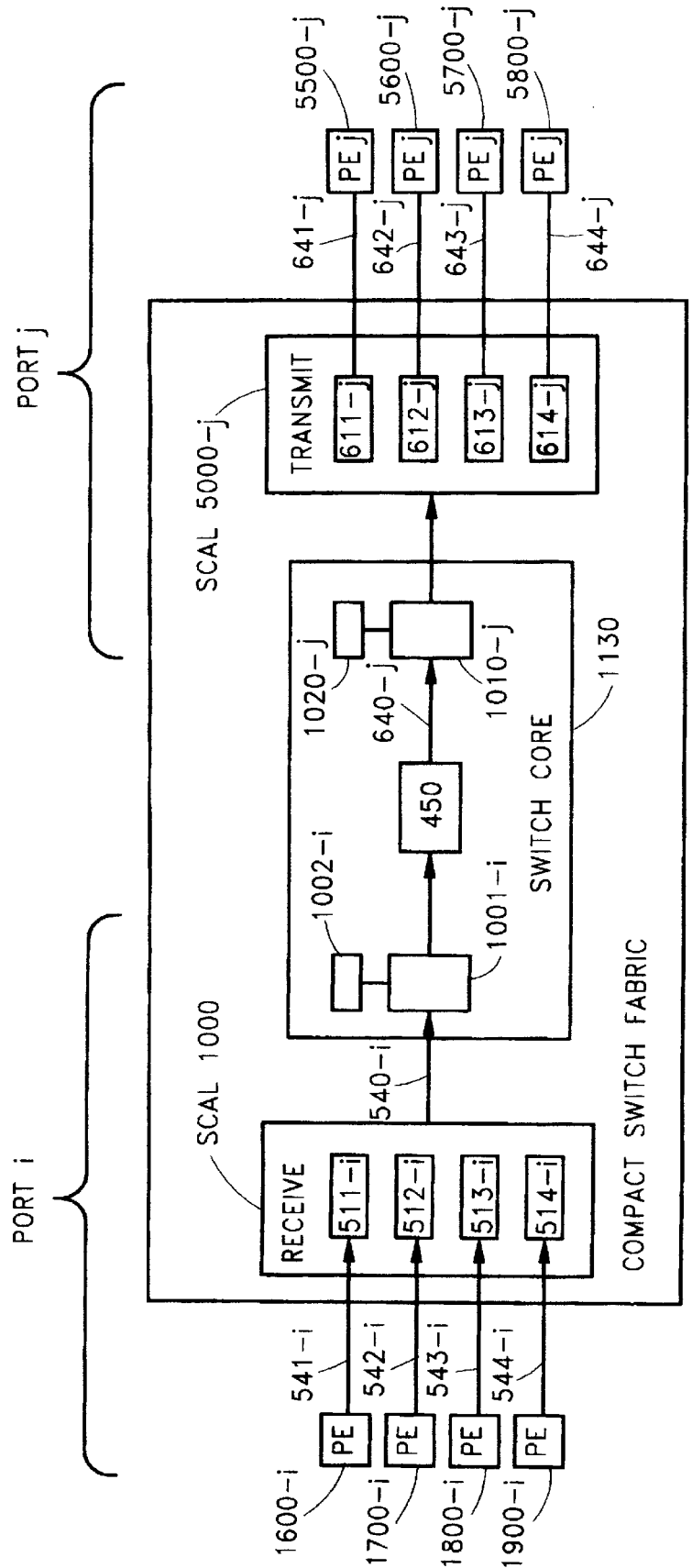
FIG. 10 illustrates a compact switch fabric embodiment enhanced in order to provide wide multicast capability.

FIG. 10 illustrates a substantial optional enhancement that can be brought to the switching fabric of FIG. 7, thereby providing wide multicast capabilities for both the compact and distributed switch fabric embodiments. For clarity's sake, the explanation will be made for the compact switch fabric embodiment, where the SCAL elements can directly communicate with the switching structure 450 by means of bus 540 without the use of the additional path formed of the serializer, the optical channels and the deserializer (required for forming again the 32 wide bus at each input port of the switch core 1130).

In this figure, indicia i and j are introduced in order to clearly illustrate the logical path of a cell arriving at one input port i and routed to output port j. Additionally, it is assumed that the sixteen SCAL that are attached to the switching structure are based on a similar structure, that is to say includes four identical PINT elements (associated to four corresponding Protocol Engines).

In the figure, it is shown that bus 540-i, connecting the switch structure 450 to the PINT receive circuit 511-i, 512-i, 513-i and 514-i of SCAL element 1000, is separated in two parts by means of the insertion of a routing control device 1001-i. Similarly, bus 640-j that connects the output of aggregate switching structure 450 to the PINT transmit circuits 611-j, 612-j, 613-j and 614-j of SCAL 5000-j, is separated by means of the insertion of another Control Routing Device 1010-j. Each control device among the set of 32 control devices being inserted in the 32 input and output busses of switching structure 450 is associated to a corresponding Routing Control Table 1002-i and 1020-j which is used for performing the routing process of the cell. For instance, Control Device 1001-i is associated with its corresponding Routing Control Table 1002-i, while Control Device 1010-j is associated with its corresponding Routing Control Table 1020-j.

This enhanced compact switch fabric operates as follows: Assuming for instance that Protocol Engine 1600-i at port i generates a cell comprising a Switch Routing Header (SRH) followed by a payload. This SRH is characteristic of the destination Protocol Engine which will receive this cell. Should the cell be transported to one unique destination PE, then the switching will have to be unicast. In the reverse case, there will be multiple destination Protocol Engines and the switching will be multicast. In accordance with the above description, the cell is entered into the PINT receive circuit 511-i, which introduces within the cell a set of two bytes that will be affected to the location of the bit map that will be determined later on by the Routing Control Device 1001-i. The cell is then propagated on the bus 540-i as described above, and is presented after communication on optical lines to the Routing Control Device 1001-i. This element executes on the fly the following operations. Firstly, the latter accesses the associated Routing Control Table 1002-i, using the SRH as an address. The value that is extracted from this table is then inserted, on the fly, within the cell at the two additional locations that were inserted before by the PINT receive circuit 511-i. Therefore, the master switching module 401 receives these two bytes at its first locations within the cell coming at its input port and can use them in accordance with the two-byte header multicast mode (bit map mode) as the routing mechanism, particularly the allocation of the memory locations within the Cell Storage 1 etc.

After the cell is processed by the Routing Control Device 1001-i, the latter is presented at the input bus of aggregate switching module 450, so that the master module 401 can use the bit map appearing at its first two bytes in order to control the overall routing mechanism for the four elements. However, it should be noticed that the same mechanism could be used with one single switching module. Then the switching structure 450 duplicates the cell being received at the appropriate output ports. Assuming that the cell being considered is duplicated at the ports j, k and l, it will appear on busses 640-j, 640-k and 640-l.

The cell being presented on bus 640-j is entered into the Routing Control Device 1010-j which, as above, accesses the associated Routing Control Table 1020-j in order to extract data -that includes a two-byte bit map that will be used by the transmit part of PINT element 100-j of the SCAL circuit 1000. This extraction uses the SRH data that is incorporated in the cell being received. It should be noticed that, as above, the access of Routing Control Table 1020-j can also be used for providing additional bits that can be advantageously used for control purposes.

The newly extracted bit-map header is then used by SCAL circuit 5000-j for determining which one(s) of the PINT transmit circuits 611-j; 612-j, 613-j and 614-j will have to propagate the cell. For instance, should the bit map only contain a single "1", then the cell will be propagated to one single element (for instance block 611-j), while if the bit map contains two instances of "1" the cell will be propagated by two different elements. It therefore appears that a second duplication step is introduced, the former one occurring within the switching structure 450. Each Protocol Engine 5500-j, 5600-j, 5700-j and 5800-j can then be accessed by the cell in accordance with the bit-map that was determined by Routing Control Device 1010-j, which bit-map was uniquely determined in accordance with the SRH that was transported by the cell.

It appears that the SRH that is determined by each Protocol Engine is considered by the switching structure 450 and the PINT circuits of SCAL 1000-i as a part of their payload, while the routing header used for controlling the switching mechanism is locally generated from this SRH. The same mechanism applies for the ports k and l, thus resulting in the cell being duplicated by one or more elements 611-k, 612-k, 613-k or 614-k, 611-l, 612-l, 613-l or 614-l of the PINT elements 100-k and 100-l. Wide possibilities of multiplexing through the two distinctive multiplexing stages is thus permitted within the switching system.

In the preferred embodiment of the invention, the Routing Control Devices are located within the switch core 450. This substantially enhances the possibilities of the switch since it becomes very simple to update the different contents of the multiple Control Routing Tables. Additionally, this presents the advantage of the possibility of using slower, cheaper and larger memory than that used for embodying Multicast table 6 (which must be very rapid since it might occur that the latter is continuously in operation during one cell cycle). Further, the possibility of providing larger storage (also resulting from the fact that this storage may be located outside the chip of the switching module) for embodying Control Routing Tables permits increase in the number of routing SRH labels.

Figure 11:
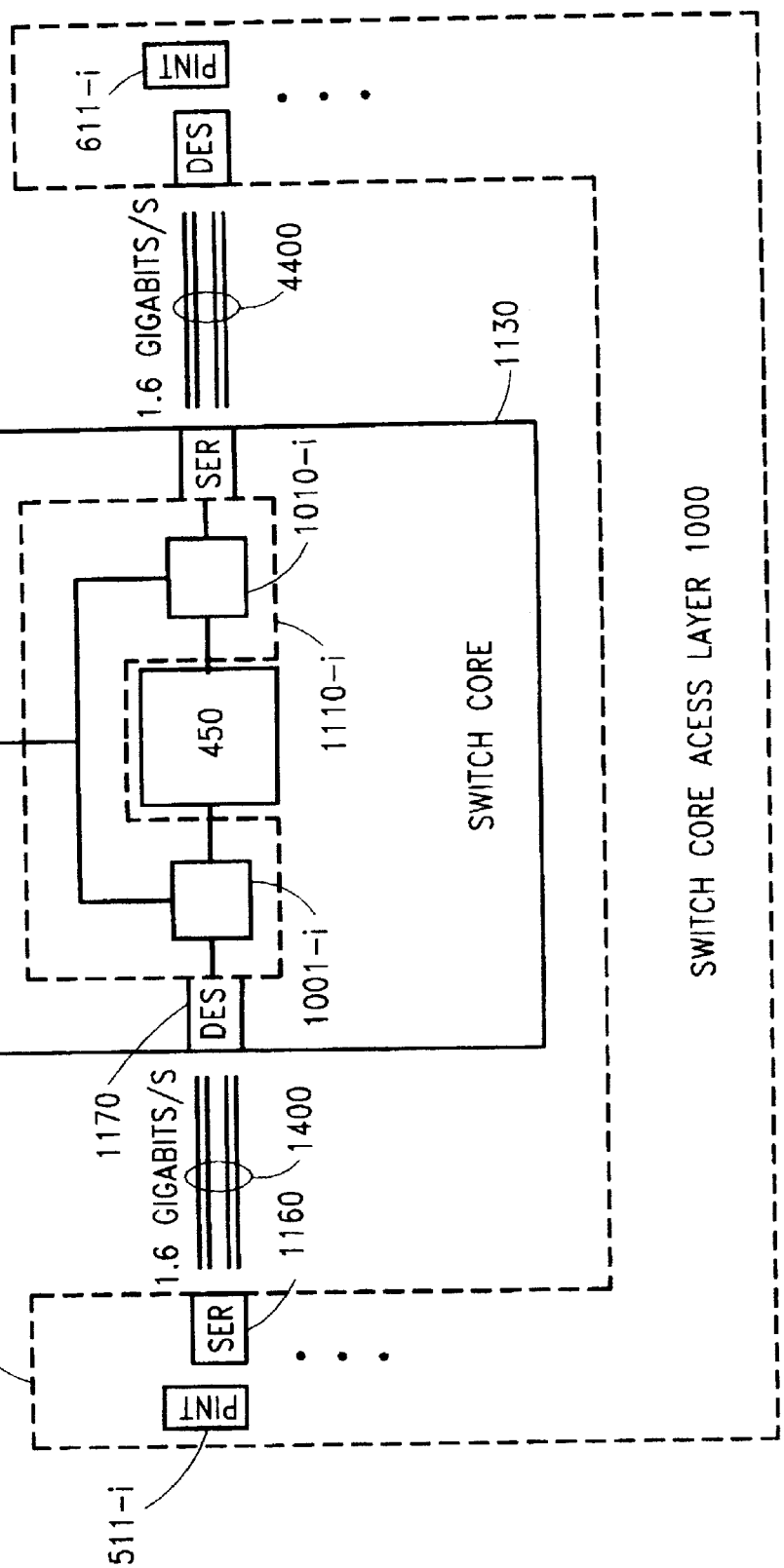
FIG. 11 illustrates the distributed switch fabric enhanced in order to provide wide multicast capability.

At last this feature appears to be very simple to embody the second so-called distributed switch fabric embodiment where the SCAL elements 1000–5000 are to be located at different physical locations of an industrial area. FIG. 11 shows the arrangement of the distributed switch fabric that providing great flexibility and high speed and which further permits, by using the Control Routing mechanism described above, a wide multicasting capability. Dotted lines represent the physical boundaries of the modules or packages.

There is shown the switch core 1130 taking the form of one physical apparatus, which includes the switch structure 450, generally embodied under the form of a card comprising at least the four switching elementary modules, each module being an electronic chip. The two Routing control devices 1001-i and 1010-i that are associated to a same port i are embodied into a same physical chip 1110-i that is associated to a corresponding storage 1120-i containing the two Routing Control Tables 1002-i and 1020-i described above in reference with FIG. 9. It therefore appears that switch structure 450 and the sixteen associated modules 1110 and 1120 are advantageously located in the same physical package, while the different SCAL elements are distributed in the different physical area of the industrial premises where line attachment needs exist.

As mentioned above, the distributed switch fabric comprises a set of N physically distributed SCAL packages (N being equal to 16 in the preferred embodiment of the invention), with only SCAL package 1000 being represented in the figure. Every SCAL package contains the PINT receive and transmit circuits that are each associated to one attached Protocol Engine. The latter are embodied under the form of additional cards that are plugged into the SCAL electronic circuitry board. Since the 1.6 Gigabit/s communication link between each SCAL and the switch core 1130 is achieved by means of a set of optical fibers (at least four for the data path), the two elements can be separated by a large distance with an optical fiber. This is very advantageous since it becomes possible to realize a powerful switching connection whatever the position of the different telecommunication links on the industrial premises. Should, for instance, an ATM link be located in a first building and an OC3 in a second one, the invention achieves the switching connection by simply using a first SCAL package receiving an ATM PE in the first building, a second SCAL element in a second building, etc. This example shows the great flexibility of the solution of the present invention that particularly avoids the drawbacks of solutions of the prior art, based on costly telecommunication cables or on multiple switches that are arranged in networks, each switch being located into one premise, thus using their ports for the network connection. Since the ports are used for achieving the network connections of the different switches, it obviously results that these network connection ports are lost from the customer standpoint because they can not be affected to a communication link. The architecture of the present invention eliminates all these drawbacks.

Further, it could be possible to use the teaching of document "Single-chip 4×500 Mbaud CMOS Transceiver" from A. Wilmer et al, in IEEE ISSCC96, Session 7, ATM/SOMET/PAPER FA 7.7. (Feb. 9, 1996) for providing the possibility of embodying the 1.6 Gigabit/s communication links 1400, 2400, 3400 and 4400 which is incorporated by simple reference. This document shows the possibility of using the so called 8B/10B. During idle periods that are marked by a flag, fill packets of data are transmitted, which start with a non-data Comma character. The Comma marks both byte and cell boundaries on the serial link. Therefore, synchronization at the byte and packet level can be provided and the 1.6 Gigabit/s communication link may be embodied by means of an unique set of four cables, either coaxial or optical. The reduction of the number of cables is substantial since, without this feature, at least five or six optical lines would be necessary for embodying the 1.6 Gigabit/s communication link.

It should be noticed that the Switch Core package 1130 contains a processor 1160 which can access, for control purpose, any storage and register within the package. In addition, there is incorporated additional circuitry that monitors the presence of the particular bit map header being set to X'0000', which causes the cell to be extracted from the normal data processing using ASA and NSA registers and being directly loaded into one particular fixed location within the storage 1, shown in the figure under the name Control Packet Storage. This achieves a general extraction process allowing the processor to gain access to control cells. Conversely, the process is also provided with an insertion process allowing the possibility to propagate a cell loaded into the last position of the memory towards any one of the output ports.

As the particular bit map X'0000' is used for control purposes between the control processor (inside the switch core) and other components of the switch fabric, the latter value is no longer available for discarding the cells. This possibility is reestablished by means of an additional control bit, a so-called "valid bit", for discarding the cells. The valid bit is provided from the read operations of tables 1002 and 1020. It should be noticed that one skilled in the art may advantageously loop the steps 1320 and 1330 in order to directly update the table 1002-i, before initiating the update process of table 1020-i. However such details of implementation will depend of the particular context. Therefore it appears that the general control processor that is located within the switch core package can access and load values within the sixteen Routing Control Tables that are embodied into the sixteen storages modules 1120.

Figure 12:
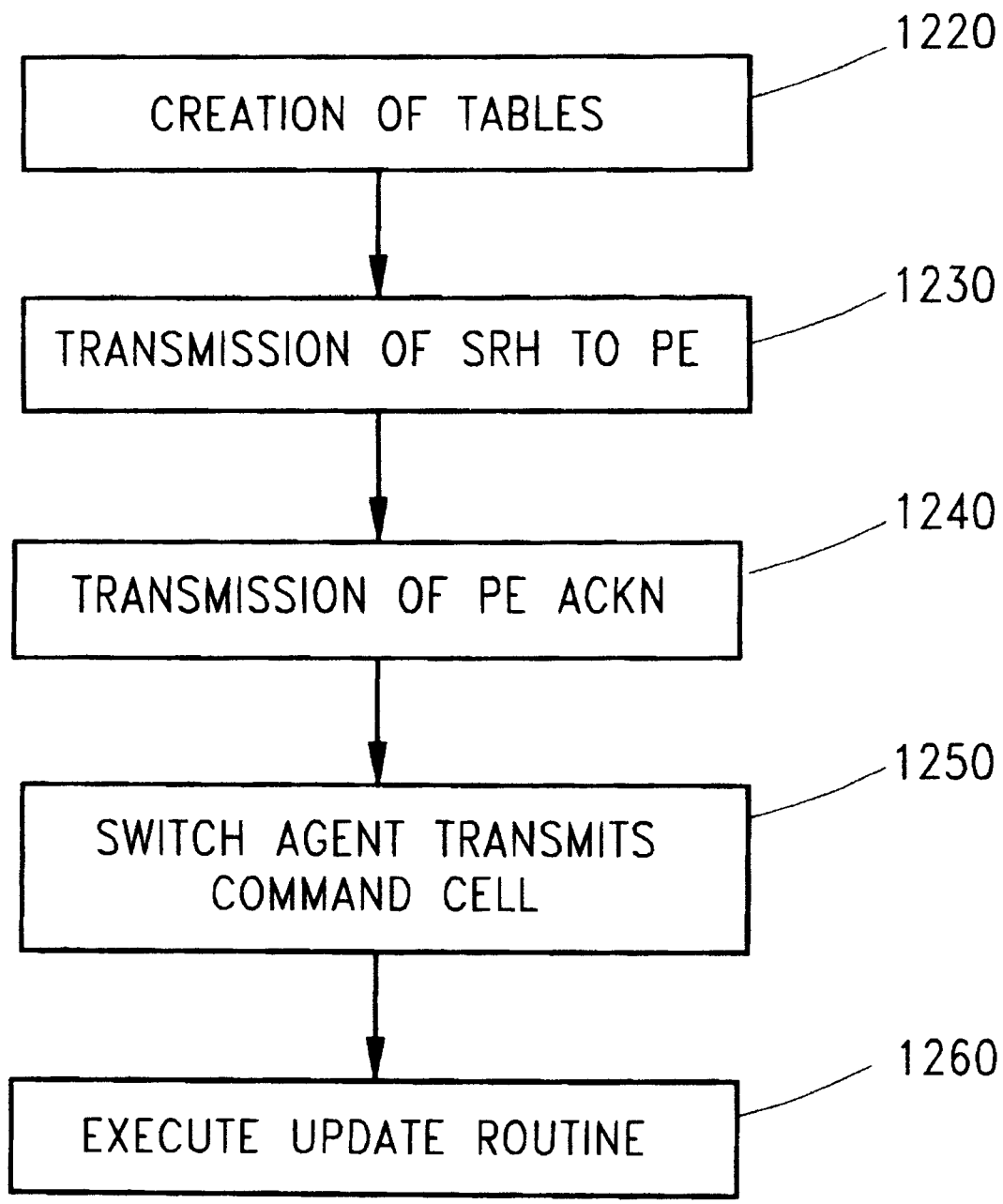
FIGS. 12 and 13 illustrate the update and creation procedure of the Control Routing Tables.

Now it will be described the general procedure that is used for creating and updating the Routing Control tables 1002-i and 1020-i which are located in the same chip. The procedure is illustrated in FIG. 12. First, the procedure begins with an initialization step 1220 where the control processor 1160 affects a set of SRH routing labels. This is made possible since the processor is aware of its own topology and therefore can assign some SRH values that can distinguish the different Protocol Engines connected to the different ports. This is achieved by using the following allocation procedure: the processor first determines the number of Protocol Engine that are associated to a given output Port, and then assigns a number of SRH values so as to distinguish the PE to each other. For instance, assuming that port number 0 is associated to four different Protocol Engines (connected to SCAL 1000), the processor will reserve four different SRH values to each Protocol Engines and so one. Therefore, according to the topology of the switch architecture, the control processor 1160 assigns the desired number of SRH values that are needed to distinguish the different Protocol Engines.

Next, the Routing Table creation can be executed. Firstly, it should be noticed that each Table 1002-i will contain the same data, since all the cells that will arrive on bus 540-i (and contain the same SRH routing label) will have to be propagated to the same output port. The SRH is characteristic of the destination, and not the connection. Therefore, the processor builds a table which complies to the following format:

Therefore, since it knows the output port that has to be used, it can determine the unicast SRH (that is the SRH provided during the initialization period 1220) that is needed. At step 1250, the switch agent initiates the building of a COMMAND cell which will be directed to the processor 1160 within the switch. This cell will present a payload that is arranged as follows:

!Command ! SRH affected to connection ! label1 label2 label3...!

with a first field (Command) defining a particular command which is requested by the switch agent. The second field, namely the SRH_connection field is used for defining the SRH that is affected to the connection and then follows one or more unicast routing labels that define the destination Protocol Engines for the cells which will include the SRH defined in the second field. Basically, the third field comprises the distribution list of the unicast routing labels (which were already affected during the initialization period 1220) of the destination PE.

Then, in step 1260, processor 1160 uses this information being received in order to store into memory 1002-i, at the

| Add ! data loaded into table 1002-0 | data loadad into table 1020-0 (left adjusted). |
|---|---|
| X'0000' X'8000' port 0 of 450 X'8000' | PE number 0 on PINT of SCAL 1000-0 |
| X'0001' X'8000' port 0 of 450 | |
| X'4000' representing "0100 0000 0000 0000" | PE number 1 on the PINT. |
| X'0002' X'8000' port 0 of 450 | X'2000'' PE number 2 on the PINT. |
| X'0003' X'8000' port 0 of 450 | X'1000' PE number 3 on the PINT. |
| X'0004' X'4000' por 1 of 450 | X'8000' PE number 0 on PINT 1000-1. |

A similar format is used for the tables 1002-1 and 1020-1, then 1002-2 and 1020-2, etc., but the values that are therein loaded are set to zero (with the exception of the valid bit). A more detailed representation of the table, clearly illustrating the use of the valid bit, can be found in the attached Annex A.

Additionally, a particular SRH value is reserved for the communication between the processor 1160 and any PE. The initialization procedure completes when the different Control routing tables are loaded. Then, in step 1230, processor 1160 uses the general insert capability for transmitting to every Protocol Engine a cell, characterized by a specific format, in order to inform it of the particular SRH value that was assigned to it. Therefore, each PE is made aware of a particular SRH value distinguishing it from the other ones. Next, in step 1240, each adapter acknowledges this assignment by means of the specific SRH value that is dedicated for the communication between processor 1160 and the PE.

Thereafter, at 1250, a switch agent that operates within one particular protocol engine is used for managing the different connections. Such a function is well known to the skilled man and involves, in the particular ATM case, the management of the allocation of the VP/VC parameters. This switch agent is used for handling the correspondence between the different connections and the SRH routing values that were affected to each Protocol Engines. It should be noticed that numerous connections can be associated to one single PE. Generally speaking, the switch agent is aware of the precise topology of the network that may include a wide number of different switches in addition to the one illustrated in FIG. 11. In particular, the switch agent can determine, should a switch X located into one country wish to communicate with a switch Y located into another area, which output ports are involved in this communication.

address defined by the second field (SRH_connection), the data that will be used for controlling the different Control Routing Devices. This is advantageously achieved by the update routing algorithm that follows and which uses the unicast SRH allocation that were made during the initialization procedure.

Figure 13:
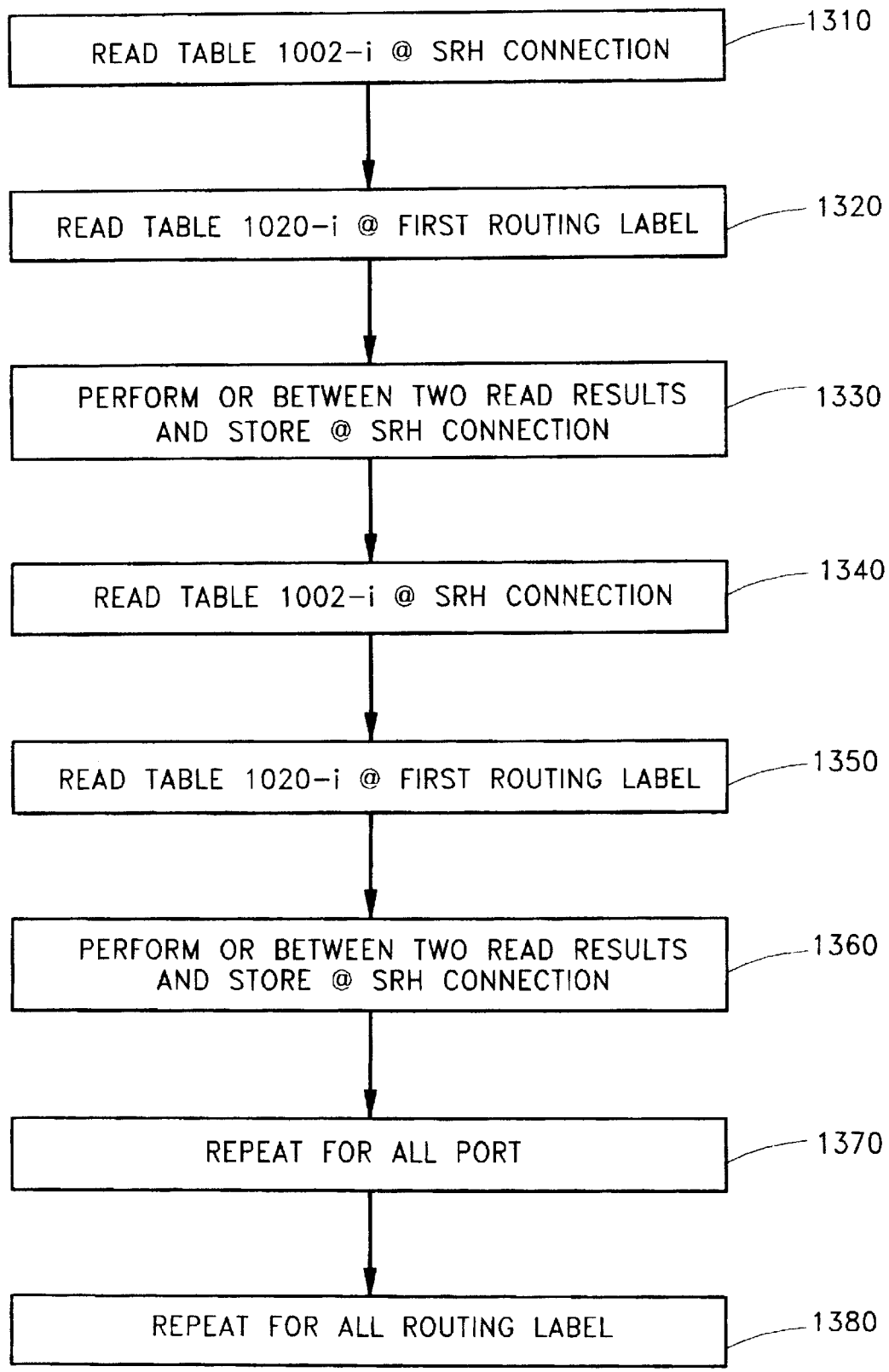

The update algorithm is shown in FIG. 13 and operates as follows:

In step 1310, processor 1160 performs a read operation of table 1002-i at the address defined by the value carried by the second field of the switch agent command cell.

Then, in step 1320, processor 1160 performs a read operation of table 1002-i at the address which is determined by the first routing label carried by the third field of the switch agent command cell. This read operation returns a X value.

Then, in step 1330, the processor performs a logical OR of the value X of step 1320 with the value returned by step 1310. This logical OR results in the addition of the ports that miss in the unicast configuration. The result of the OR operation is then loaded into table 1002 at the address SRH_Connection.

In Step 1340, processor 1160 performs a read operation of table 1020-i at the address defined by the value carried by the second field of the switch agent command cell.

Step 1350, processor 1160 performs a Read operation of table 1020-i at the address which is determined by the first routing label carried by the third field of the switch agent command cell. This returns a value Y.

In step 1360, a logical OR is performed between the value Y returned in step 1350 and that returned in step 1340 and the result of the OR operation is stored into table 1020-i at the address that is defined by the second SRH_Connection field carried by the switch agent command message.

Steps 1310 to 1360 are executed for any ports so that all the sixteen tables 1002 and 1020 can be updated (step 1370).

In the case where the switch agent command message has a third field that comprises more than one routing label (e.g., label2 and label3), the preceding procedure is performed again for all the remaining labels (step 1380). For instance, for the second label appearing in the third field, the procedure will be the following:

Processor 1160 performs a read operation of table 1002-i at the address defined by the value carried by the second field of the switch agent command cell (step 1310).

Next, processor 1160 performs a read operation of table 1002-i at the address which is determined by the second routing label carried by the third field of the switch agent command cell (step 1320). This read operation returns a X value. A logical OR between the two values can then be performed and the result can be loaded into table 1002-i at the address SRH_Connection.

The update of table 1020-i can then be executed, by performing a logical OR of the value extracted at the address defined by the address SRH_Connection and the value extracted at the address defined by the second routing label. The result can then be loaded into table 1020-i at the address SRH_Connection. The processing of the second routing label proceeds then with the update of all the other tables 1002 and 1020.

This algorithm appears particularly efficient as it allows the switch agent, being generally located in one Protocol Engine of the switching system, to update the different routing tables of the switch core 1130 without being aware of the internal topology of the switch. The logical OR operations permit easy addition of output ports to a unicast configuration, of which the switch agent need not be aware.

It should be noticed that the updating process that was described before can be executed for any new connections required by the switch agent. Whenever a new connection is requested, the update of the routing tables 1002 and 1020 can be easily achieved by a simple transfer of a switch agent command cell via the normal data path using a simple connection cable.

Below is described the functional operations that are involved in the deletion process of one label in a SRH connection. The principle is to search the particular value of i for which, in table 1020-i at the address defined by the considered label, the valid bit appears to be set to ON. At this location, the contents of table 1020-i (that is to say, the bitmap) are kept as a value X. In the next step, a read operation is performed in this table (1020-i) at the address defined by the particular value of SRH_connection to get the bitmap therein loaded (i.e., Y). Then, an AND operation is performed between Y and the inverted value of X. The resulting Z is stored again at the address that was defined by the SRH_connection field. If the above resulting Z is different from zero (thus implying that there still remains a unicast label on this SRH_connection), the bitmap must be kept to a state ON. Tables 1002-i remains unaffected.

When the value of Z appears to be equal to zero (thus implying that the delete operation was performed on the last label forming the SRH_connection), then the valid bit corresponding to the particular SRH_connection being processed is set to OFF. Additionally, since the last Protocol Engine has to disappear, all the different tables 1002-i (with i=0 to 15) will be updated in order to suppress the output port (corresponding to the latter Protocol Engine) at the address SRH_Connection. In the case where the resulting bitmap is equal to zero, then an additional step is performed in order to set the valid bit to zero. Similar to the creation process, the delete operation appears very simple since it does not require that the switch agent be aware of the precise topology of the switching system.

Figure 14:
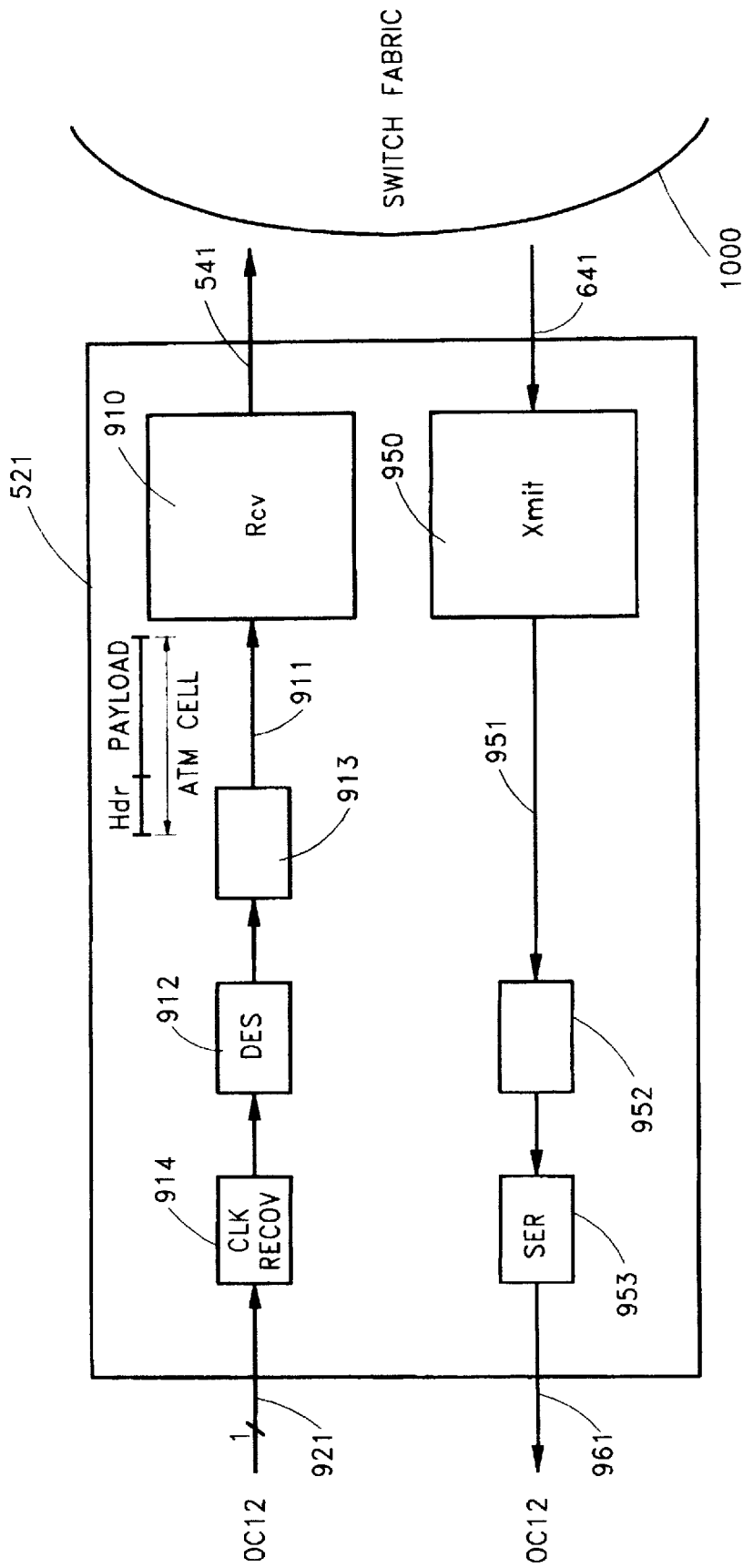
FIG. 14 shows the structure of a Protocol Engine well suited for interfacing lines carrying ATM cells.

With reference to FIG. 14, there is shown a particular embodiment of an enhanced "Protocol Engine" component that is well suited for interfacing lines carrying ATM cells. As shown in the figure, Protocol Engine 521 is based on a receive process block 910 for managing the ATM incoming flow and for preparing the latter for the attachment to the SCAL 1000. Receive block 910 has an input which is connected to 2-byte bus 911 and an output which is connected to a similar bus, namely bus 541. Conversely, Xmit process 950 receives the routed cells from bus 641 and provides with the ATM cells on bus 951. In the example shown in the figure, the PE is attached to one OC12/STM4 line. As known by the skilled artisan, such an attachment involves the use of traditional functions such as clock recovery at 914, deserialization at 912 and ATM cell delineation at 913 so as to convert the physical one-bit data flow on lead 921 into a 16 bit ATM cells on bus 911. It should be noticed that such functions involved well known circuitry, traditionally used in line interfaces, and will not be described with more details. Conversely, the transmit path involves the Xblock 950 providing ATM cells on a 16-bit bus 951 that will be transmitted to the one-bit physical media on lead 961 via a block 952 and a serializer 953. Block 952 provides insertion of the ATM cells into the Synchronous Digital Hierarchy (S.D.H.) bit stream.

Figure 15:
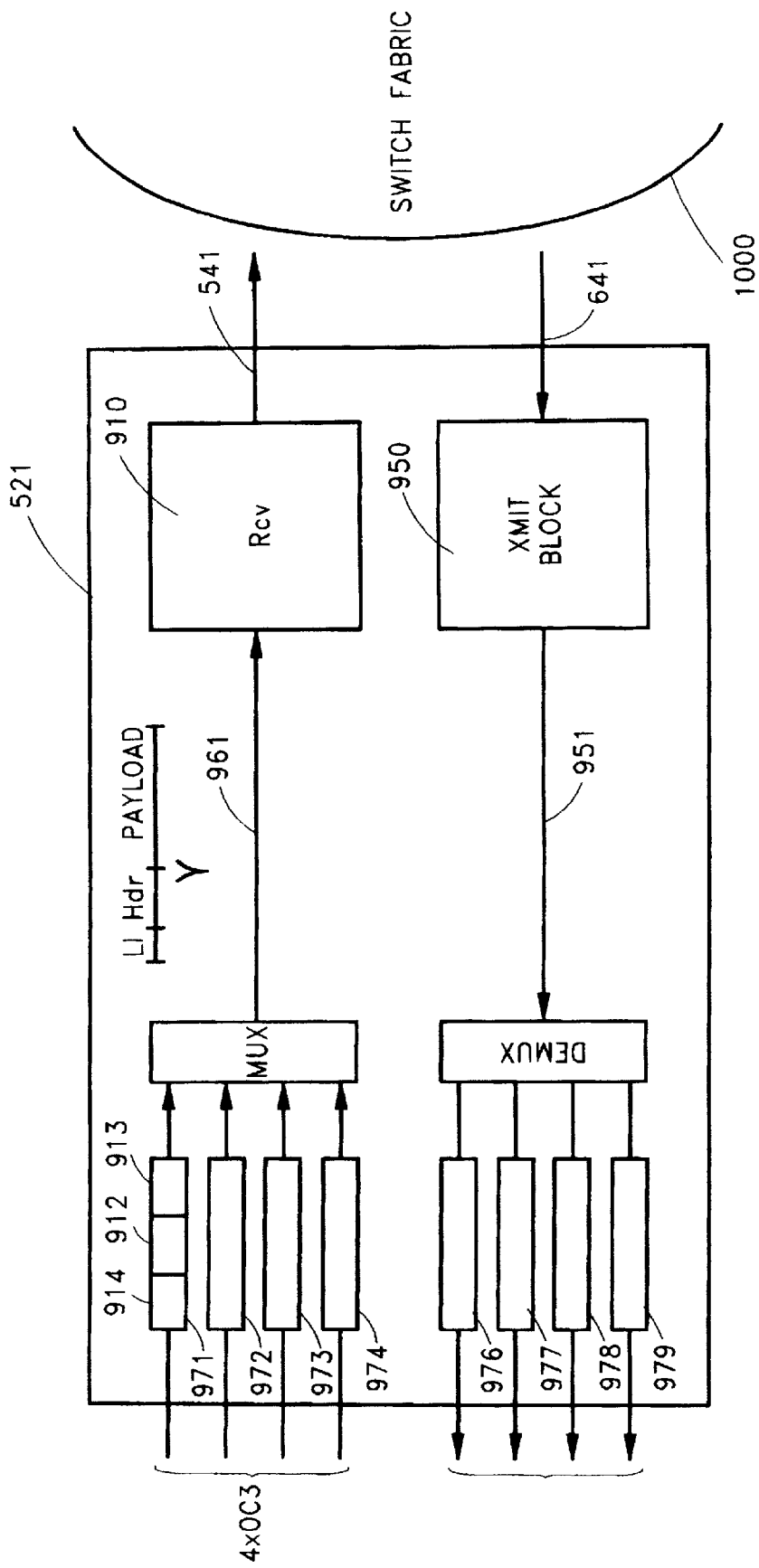
FIG. 15 shows a structure that is adapted for the attachment of four lines OC3 line interfaces via a set of four receive line interfaces and four transmit line interfaces.
Figure 16:
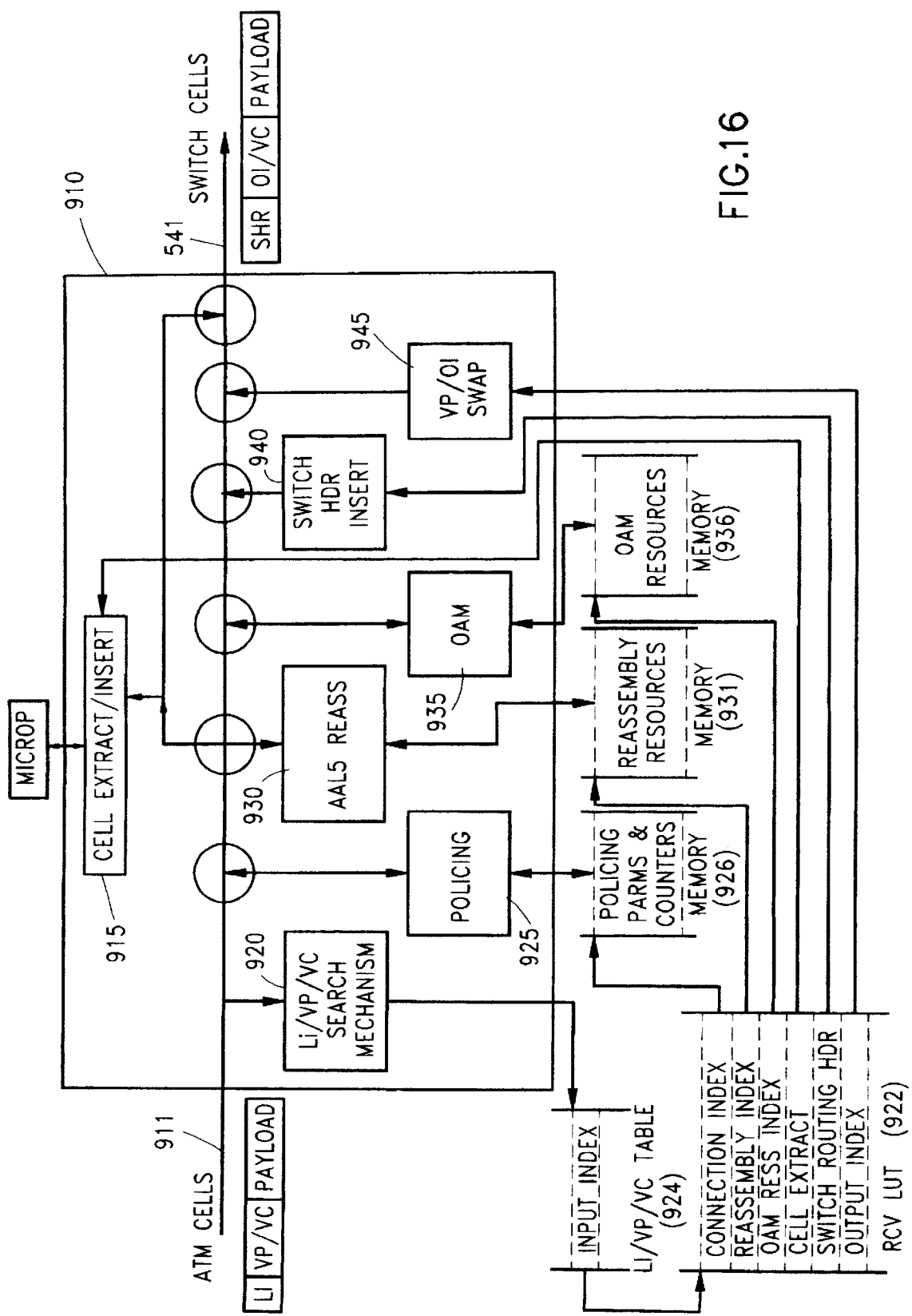
FIG. 16 shows the receive part of block 910 of the ATM Protocol Engine.

With respect to FIG. 15, there is shown a similar structure that is adapted for the attachment of four line OC3 line interfaces via a set of four receive line interfaces 971–974 and four transmit line interfaces 976–979. For instance, receive line interface 971 comprises circuits 914, 912 and 913 of FIG. 15 and transmit line interface 976 may comprise circuits 952 and 953 of FIG. 15. With respect to the receive part, the output of the four blocks 971–974 are multiplexed at the cell level before the cells are generated on bus 911. Similarly, the flow of cells that is produced by Xmit block 950 is demultiplexed at the cell level so as to produce the four trains of cells which are transmitted to the appropriate OC3 line interface. In one embodiment of the invention, the format of the cell that is received by receiver 910 may comprise three fields: a first one-byte field that defines the accurate line on which the current cell was received, a second field comprising the 5-byte ATM header, and a third field comprising the ATM payload. However, it should be noticed that other embodiments may take advantage of the so-called level_2 UTOPIA interface which provides the ATM layer the capability of controlling several line interfaces. Such techniques are well known to the skilled artisan and will not be further described. In this case, the cell received by receiver 910 may only comprise the ATM cell (i.e., the header and the payload) and the information defining the associated line is provided to receiver 910 by means of a separate way (not shown) With respect to FIG. 16 there is shown the detailed structure of receive block 910. Basically, block 910 is based on a pipeline structure that successively performs elementary operations in order to convert the cell appearing on bus 911 into a switch cell on bus 541 that will be handled by the corresponding PINT element of the locally attached SCAL 1000.

Firstly, receiver 910 comprises a Search block 920 that receives the cell on lead 911 using the LI/VP/VC field in order to access a LI/VP/VC table 924 for providing an input index. The access mechanism of such a table is well known and may advantageously use, by way of example, the teaching of European Patent Application No. 94909050.0, owned by IBM Corp., which shows an effective solution when a great number of different addresses (for instance 16000) are required. In the particular case where the LI/VP/VC appears to be not included in table 924, block 920 causes the cell to be discarded so that the latter will not be processed by the remaining part of the receiver block 910. In the case where an input index is associated to the particular LI/VP/VC value being carried by the cell, the input is used for accessing a second table, namely a RECEIVE Look Up Table 922, which is organized in order to contain, for each input index, a set of additional indexes which will be needed for the remaining part of the processing used by receiver 910.

More particularly, Table 922 is organized to contain the following fields: A CONNECTION Index, a REASSEMBLY Index, an OPERATION AND MAINTENANCE (OAM) index, a CELL EXTRACT index, the SWITCH ROUTING HEADER that will be used by the switch fabric and particularly by the PINT element, and the switch core, and an OUTPUT index that will be used in conjunction with the transmit block 950.

When block 920 completes its processing, the cell is processed by a POLICING block 925 which checks the conformance of the cell regarding the traffic parameters which have been defined for the particular ATM cell connection to which the considered cell belongs. To achieve this, block 925 uses the CONNECTION index returned by the access to table 922, in order to access a POLICING and PARAMETERS COUNTERS table 926 in order to check the incoming cell. Block 925 may check the conformance of the cell to the Generic Cell Rate Algorithm (GCRA) that is well known to one skilled in the art and is recommended by the International Telecommunication Union (I.T.U.). Should non-conformance to the GCRA algorithm be detected, then the cell may be discarded in accordance with the above mentioned recommendation.

After the conformance processing performed by block 925, the cell is received by AAL5 block 930 which uses the REASSEMBLY index provided by table 924 for determining whether the cell which is currently received should be directly forwarded to the next block 935, or reassembled in accordance with the well known AAL5 format. In the latter case, AAL5 block 930 causes the payload being transported in the cell to be loaded into a buffer (not shown). It should be noticed that since the storage capacity is limited, the number of reassembling operations which can be simultaneously performed is also limited. When the full message is available into this memory, the latter may be accessed by the control processor located within the Protocol Engine.

If the cell is not to be reassembled, block 930 lets the latter be processed by an OAM block 935. The latter uses the OAM RESOURCES index in order to determine whether or not the received cell belongs to a connection (defined by the VP/VC), if OAM performance monitoring as specified in the I. 610 ITU Recommendations was made. If the cell is not under OAM performance monitoring, then block 935 lets the cell be processed by the next block 940. In the reverse case, however, block 935 determines whether or not a particular OAM cell is to be inserted or extracted, depending upon the actual number of user cells which were already received or transmitted according to the case. For instance, in the case of cell insertion, block 935 determines the opportunity of inserting an additional OAM cell (having a specific VP/VC) in accordance with the actual number of cells belonging to the considered connection which were already transmitted since the last OAM cell insertion. In the case of cell extraction, conversely, block 935 achieves the extraction of the AOM cell that is received. It should be noticed that, since the receiver block 910 is based on a pipeline device, the insertion mechanism is actually performed at the first empty cell slot within the pipeline. This is made possible since the receive block 910 is designed so as to operate slightly faster than the accurate data throughput of the lines which are thereto attached, thus ensuring the existence of sufficient empty cell slots within the cell flow. Additionally, an independent CELL EXTRACT/INSERT block 915 is fitted for the control processor inside the receiver block 910 so that the latter may also perform extraction in accordance with the contents of the CELL EXTRACT field, or insert a cell when appropriate.

When block 935 completes its process, the cell is received by SWITCH HEADER INSERT block 940 which uses the SWITCH ROUTING HEADER that was read from the access to table 922, and appends the latter to the cell being received before it is transmitted to VP/OI swap block 945. The latter uses the contents of the OUTPUT Index that will be inserted within the cell in lieu of the eight LSB of the VP, plus the Header Correction Code (H.E.C.) field. As will be shown hereinafter with more details, the latter will be used by the transmit part of the protocol engine for establishing the final VP/VC that will be required at the output of the PE. In other embodiments of the invention, the OI field may also be transmitted as a separate field which may be located at the first location of the cells. It should be noticed that the OUTPUT index is characteristic of a specific process that is involved in the destination Protocol Engine. Therefore it may happen that two distinctive connections may use the same output index. This achieves the possibility of realizing simple multipoint to point connections.

From the above described mechanisms, the SCAL 1000 receives a switch cell on bus 541 that takes the form shown in the figure. A substantial advantage resulting from the structure of receiver 910 comes from the arrangement of the different tables into Memory and the organization in pipeline which permits each blocks 920, 925, 930, 935, 940, 945 to perform an elementary operation prior to the processing made by the block that follows in the path. This ensures that the whole receiving process be achieved in a limited period, which appears essential for high speed lines.

Figure 17:
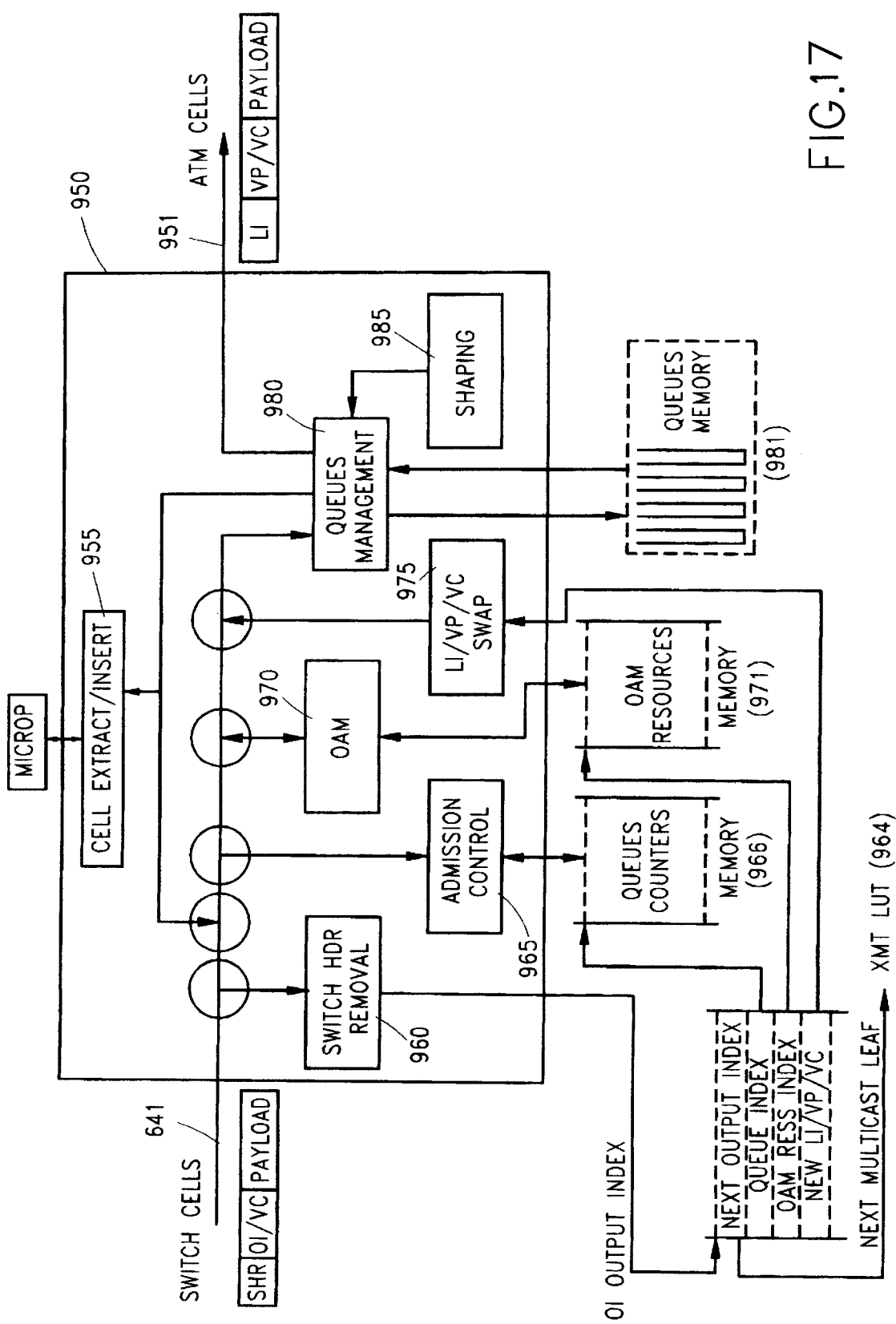
FIG. 17 illustrates the transmit part of block 950 of the ATM Protocol Engine.

The transmit part 950 is shown in FIG. 17. The switch cell that is received from the SCAL 1000 is entered into the Xmit part and processed by a block 960 that performs the suppression of the SRH from the cell. Additionally, block 960 uses the OUTPUT index that is located within the cell for accessing a XMIT Look Up table 964 which is so arranged as to provide the following field corresponding to the OUTPUT index being considered: a NEXT_OUTPUT Index that will be used for performing multicast operations with respect to ATM connections, a QUEUE Index, a OAM RESOURCE index and a NEW LI/VP/VC that will be used for reestablishing the cell in the state where it was received by receiver 910.

The cell is then processed by a ADMISSION CONTROL module 965 which checks the state of the queue that is associated to the particular connection corresponding to the cell being processed. Indeed, in the preferred embodiment of the invention, transmitter block 950 is designed for handling at least 16000 queues. When block 965 receives the cell, the QUEUE index is used for determining which queue is associated to the considered cell, and particularly for addressing a storage 966 which contains some parameters relating to this queue. Such parameters may include the number of cells being loaded into the queue, or the number of cells which could be loaded into the considered queue because of overload conditions. From these parameters, block 965 may decide or not to cause the loading of the processed cell into the queue that is associated to the considered Queue Index.

In a preferred embodiment of the invention, there is used a particular mechanism that monitors the current number of cells being loaded within the queue, and comparing this value to a predefined threshold. Should the former exceed the latter, then block 965 may either reject any additional cells, or in some restricted cases, accept additional cells when they correspond to priority connections.

In parallel with the loading of the cell into the appropriate queue, a LI/VP/VC block 975 performs the construction of a new header for the cell. This is achieved by suppressing the OI/VC from the cell being received and superseding it with the contents provided by the NEW_LI/VP/VC. It should be noticed that this construction may leave the VC field unchanged, in which case, a VP switching is performed. More generally however, the whole VP/VC field may change.

In addition to the arrangement of the 16000 queues used in the Xmit block 950, a QUEUE Management system is provided for ensuring maintenance of an ordered list of buffers in which the cells are loaded, each ordered list corresponding to one of the 16000 queue. Additionally, a Shaping device 985 causes a smooth output of the cells which are loaded into the different queues. This particularly depends upon the output rate which is allocated to each queue.

Similar to the receive block 910, a OAM block 970 is used for inserting or extracting OAM performance monitoring cells. If the cell is not under OAM performance monitoring, then block 970 does not operate. In the reverse case, however, block 970 determines, as above, whether or not a particular OAM cell is to be inserted or extracted, depending upon the actual number of user cells which were already received or transmitted according to the case.

As mentioned above for the receiver block 910, the invention takes advantage of the particular arrangement of the different tables that are used for managing the different indexes. This allows avoidance of large and costly memories. This very effective organization provides a receiver and a transmit block for an ATM Protocol Engine that allows 600 Mbits/s connections.

It appears from above, that the PE is used for performing the VP/VC swap by means of the additional output index which is embedded into the payload of the switch cell which is routed by the switch core. Without this particular feature, it would be necessary to perform the VP/VC swapping at the level of the PE receiver, thus resulting in duplication of the cell prior to its routing by the switch core. With this very effective mechanism used in the PE of the present invention, only one cell is routed through the switch core, thus minimizing the overload of the switch core, and the VO/VC swap is performed at the level of the Protocol Engine on the Xmit side before the cell is transmitted on the line. Thus, the use of the OUTPUT INDEX which is introduced by the receiver part of the Protocol engine is advantageously combined with the efficiency of the switch core that was described above.

Additionally, the mechanism could still be enhanced by using the OUTPUT index for a second function, that provides the possibility of multicasting cells on connection. This is made possible by combining a multicast buffer with an additional mechanism that is based on the use of a specific bit for the NEXT_OUTPUT index field that is produced by access to table 964. Such a mechanism is particularly well described in reference with co-pending patent applications Ser. Nos. 08/992,015, and 08/992,817, respectively entitled "Switching System Comprising Distributed Elements Allowing Attachment To Line Adapters And Having Multicasting Capabilities" and "Switching System Comprising Distributed Elements Allowing Attachment to Line Adapters", having the same priority date as the present application, assigned to the same assignee and herein incorporated by simple reference.

The invention has been described with reference to several specific embodiments. One having skill in the relevant art will recognize that modifications may be made without departing from the spirit and scope of the invention as set forth in the claims.

Having thus described our invention, what we claim as new and desire to secure by Letters Patent is:

1. A Cell Switching module for routing cells each having a cell header comprising:

a plurality of input ports;

a plurality of output ports;

at least one common cell storage connected between said input and said output ports, and comprising a plurality of storage locations having addresses;

a storage section for performing storage of cells coming through any one of a plurality of input ports into said common cell storage;

a retrieve section for retrieving said cells from storage and for transporting them to one of said plurality of output ports;

said storage section comprising a plurality of receiver means for performing the physical interface for said plurality of input ports, a plurality of input routers for connecting said input ports to said cell storage, a plurality of ASA registers for providing said input routers with addresses to be used for storing the cells into the cell storage; and said retrieve section further comprising a plurality of output routers for retrieving the data stored in any locations of said cell storage, a plurality of drivers for connecting to said output ports, a plurality of ARA registers for providing addresses of the cells which are to be outputted from said cell storage to said output routers.

2. The module of claim 1 further comprising control means having input process control means and output process control means for processing cells being conveyed through said switching module;

said input process control means further comprising address generating means for providing the addresses of empty ones of said cell storage locations, first multiplexing means for providing addresses to said M ASA registers, holding registers for retaining information from each of said routing headers of cells provided at the input ports; and said output process control means further comprising a plurality of queueing means for queueing the addresses of the locations within said cell storage containing cells to be transmitted to output ports, each queuing means having an input for receiving the contents of said ASA registers and being associated to a corresponding one of said plurality of output ports, queuing control means for receiving said routing header and for generating control signals for said queuing means to load the contents of said ASA registers into said queuing means that correspond to the output ports indicated by said routing header, and second multiplexing means for providing the addresses to said M ARA registers.

3. The module of claim 1 further comprising means for registering the number of times that a cell is to be transmitted to an output port, monitoring transmissions and preventing the cell location address from being made available before the last transmission.

4. The module of claim 2 further comprising means for registering the number of times that a cell is to be transmitted to an output port, monitoring transmissions and preventing the cell location address from being made available before the last transmission.

5. The module of claim 2 further comprising controlling means for controlling said first and second multiplexing means.

6. The module of claim 1 wherein said ASA registers, said ARA registers and said queuing means are separated in two distinctive parts to process two addresses simultaneously.

7. The module of claim 1 further comprising at least one protocol adapter, a plurality of distributed individual Switch Core Access Layer elements, each connected to said input and output ports and one of said at least one protocol adapters, each of said elements comprising a plurality of circuits comprising a receive part for receiving cells from said at least one protocol adapter, said receive part including at least one first FIFO storage for storing the cells being received, and introducing at least one extra byte to every cell header, and a transmit part comprising at least one second FIFO storage having a substantially greater capacity than said of said first FIFO storage, said transmit part adapted for receiving cells to be routed from the associated output port of said module, said transmit part including means for evaluating the value carried by said at least one extra byte and handling said cells accordingly.

8. The module of claim 7 wherein each of said circuits further comprises means for performing time division multiplexing for controlling access of the at least one first FIFO and second FIFO to said ports.

9. The module of claim 8 further comprising serializing means for converting cells being outputted from said at least first FIFO into at least one corresponding first train of bits and deserializing means for converting information received from the associated output port into a corresponding at least one second train of bytes that can be presented at the input of said at least one second FIFO.

10. The module of claim 7 further comprising means for replacing said at least one extra byte by a routing header based on a routing label generated by said at least one protocol adapter, said means located to replace said at least one extra byte before said cell is provided to one of said plurality of input ports.

11. The module of claim 7 further comprising means for replacing said at least one extra byte by a second routing header depending on the value of said routing label after the switching of the cell and before said cell is transmitted to the transmit part of said circuit.

12. A switching system comprising a plurality of switching modules each comprising a plurality of input ports, a plurality of output ports, at least one common cell storage connected between said input and said output ports, and comprising a plurality of storage locations having addresses, a storage section for performing storage of cells coming through any one of a plurality of input ports into said common cell storage, a retrieve section for retrieving said cells from storage and for transporting them to one of said plurality of output ports, said storage section comprising a plurality of receiver means for performing the physical interface for said plurality of input ports, a plurality of input routers for connecting said input ports to said cell storage, a plurality of ASA registers for providing said input routers with addresses to be used for storing the cells into the cell storage, and said retrieve section further comprising a plurality of output routers for retrieving the data stored in any locations of said cell storage, a plurality of drivers for connecting to said output ports, a plurality of ARA registers for providing addresses of the cells which are to be outputted from said cell storage to said output routers;

and further comprising means for performing a cell slicing of the cell being received so that a first switching module receives the first part of the sliced cell with the routing header and successive switching modules receive successive parts of said sliced cell, said first switching module that receives the routing header providing control signals that are transmitted to said successive switching modules so as to perform the same routing process in said successive switching modules.

13. The switching system of claim 12 further comprising control means having input process control means and output process control means for processing cells being conveyed through said switching module; said input process control means further comprising address generating means for providing the addresses of empty ones of said cell storage locations, first multiplexing means for providing addresses to said M ASA registers, holding registers for retaining information from each of said routing headers of cells provided at the input ports; and said output process control means further comprising a plurality of queueing means for queueing the addresses of the locations within said cell storage containing cells to be transmitted to output ports, each queuing means having an input for receiving the contents of said ASA registers and being associated to a corresponding one of said plurality of output ports, queuing control means for receiving said routing header and for generating control signals for said queuing means to load the contents of said ASA registers into said queuing means that correspond to the output ports indicated by said routing header, and second multiplexing means for providing the addresses to said M ARA registers.

14. The switching system of claim 13 wherein each module further comprises control means having input process control means and output process control means for processing cells being conveyed through said switching module; said input process control means further comprising address generating means for providing the addresses of empty ones of said cell storage locations, first multiplexing means for providing addresses to said M ASA registers, holding registers for retaining information from each of said routing headers of cells provided at the input ports; and said output process control means further comprising a plurality of queueing means for queueing the addresses of the locations within said cell storage containing cells to be transmitted to output ports, each queuing means having an input for receiving the contents of said ASA registers and being associated to a corresponding one of said plurality of output ports, queuing control means for receiving said routing header and for generating control signals for said queuing means to load the contents of said ASA registers into said queuing means that correspond to the output ports indicated by said routing header, and second multiplexing means for providing the addresses to said M ARA registers.

15. The switching system of claim 14 wherein each module further comprising means for registering the number of times that a cell is to be transmitted to an output port, monitoring transmissions and preventing the cell location address from being made available before the last transmission.

16. The switching system of claim 15 wherein each module further comprises controlling means for controlling said first and second multiplexing means.

17. The switching system of claim 16 wherein each module further comprises at least one protocol adapter, a plurality of distributed individual Switch Core Access Layer elements, each connected to said input and output ports and one of said at least one protocol adapters, each of said elements comprising a plurality of circuits comprising a receive part for receiving cells from said at least one protocol adapter, said receive part including at least one first FIFO storage for storing the cells being received, and introducing at least one extra byte to every cell header, and a transmit part comprising at least one second FIFO storage having a substantially greater capacity than said of said first FIFO storage, said transmit part adapted for receiving cells to be routed from the associated output port of said module, said transmit part including means for evaluating the value carried by said at least one extra byte and handling said cells accordingly.

18. The switching system of claim 17 wherein each of said circuits further comprises means for performing time division multiplexing for controlling access of the at least one first FIFO and second FIFO to said ports.

19. The switching system of claim 17 wherein each of said modules further comprises serializing means for converting cells being outputted from said at least first FIFO into at least one corresponding first train of bits and deserializing means for converting information received from the associated output port into a corresponding at least one second train of bytes that can be presented at the input of said at least one second FIFO.

20. The module of claim 19 wherein each of said modules further comprises means for replacing said at least one extra byte by a routing header based on a routing label generated by said at least one protocol adapter, said means located to replace said at least one extra byte before said cell is provided to one of said plurality of input ports.

* * * * *